(12) United States Patent
Komazawa et al.

(10) Patent No.: US 8,211,986 B2
(45) Date of Patent: Jul. 3, 2012

(54) METHOD FOR PRODUCING POLYLACTIC ACID BLOCK COPOLYMER

(75) Inventors: Yuka Komazawa, Tokyo (JP); Zhen Tang, Tokyo (JP)

(73) Assignees: Musashino Chemical Laboratory, Ltd., Tokyo (JP); Mutual Corporation, Osaka (JP)

( * ) Notice: Subject to any disclaimer, the term of this patent is extended or adjusted under 35 U.S.C. 154(b) by 433 days.

(21) Appl. No.: 12/521,725

(22) PCT Filed: Aug. 10, 2007

(86) PCT No.: PCT/JP2007/065778
§ 371 (c)(1),
(2), (4) Date: Jun. 29, 2009

(87) PCT Pub. No.: WO2008/081617
PCT Pub. Date: Jul. 10, 2008

(65) Prior Publication Data
US 2010/0324229 A1    Dec. 23, 2010

(30) Foreign Application Priority Data

Dec. 28, 2006  (JP) ................................ 2006-356241

(51) Int. Cl.
*C08G 63/91*     (2006.01)
(52) U.S. Cl. ........ 525/411; 525/410; 525/413; 525/415; 525/450
(58) Field of Classification Search ................... 525/411, 525/413, 415, 450, 410
See application file for complete search history.

(56) References Cited

U.S. PATENT DOCUMENTS

| 5,317,064 A | 5/1994 | Spinu |
| 5,496,923 A * | 3/1996 | Suizu et al. .................... 528/501 |
| 5,844,066 A | 12/1998 | Kakizawa |
| 6,365,173 B1 * | 4/2002 | Domb et al. .................. 424/426 |
| 2008/0039579 A1 | 2/2008 | Kimura et al. |

FOREIGN PATENT DOCUMENTS

| JP | 08-231688 | 9/1996 |
| JP | 09-040761 | * 2/1997 |
| JP | 2002-356543 | 12/2002 |
| JP | 2003-238672 | 8/2003 |
| JP | 2003-342836 | 12/2003 |
| JP | 2004-026876 | 1/2004 |
| JP | 2006-028336 | 2/2006 |

\* cited by examiner

*Primary Examiner* — David W Wu
*Assistant Examiner* — Robert Jones, Jr.
(74) *Attorney, Agent, or Firm* — Fox Rothschild LLP; Peter J. Butch, III; Robert N. Henrie, II

(57) ABSTRACT

It is an object of the present invention to provide a method for producing a polylactic acid block copolymer having high molecular weight, and in lower cost, wherein only a stereo-complex crystal is capable of growing, even when heat melting process is repeated. The present invention relates to a method for producing a polylactic acid block copolymer characterized in that (i) ring-opening polymerization of D-lactide (D component) is carried out in the presence of poly-L-lactic acid (L component), or (ii) ring-opening polymerization of L-lactide (L component) is carried out in the presence of poly-D-lactic acid (D component), and mass ratio of the D component and the L component is the D component/the L component=60/40 to 91/9, or the L component/the D component=60/40 to 91/9.

20 Claims, 11 Drawing Sheets

US 8,211,986 B2

METHOD FOR PRODUCING POLYLACTIC ACID BLOCK COPOLYMER

CROSS REFERENCE TO RELATED APPLICATION

The present application is a 35 U.S.C. §371 National Phase filing of International Application Serial No. PCT/JP2007/65778 filed Aug. 10, 2007, which claims priority under the Paris Convention to Japanese Patent Application Serial No. 2006-356241 filed Dec. 28, 2006. The disclosures of both applications are incorporated herein by reference in their entirety.

TECHNICAL FIELD

The present invention relates to a method for producing a polylactic acid block copolymer, and more specifically the present invention relates to a method for producing a polylactic acid block copolymer having high molecular weight, and in lower cost, wherein only a stereo-complex crystal is capable of growing, even when heat melting process is repeated.

BACKGROUND OF THE INVENTION

Many of plastics derived from petroleum are light-weight, tough, superior in durability and are capable of being easily formed in an arbitrary shape, and thus have been mass-produced to support our life in various fields. However, these plastics are not decomposed easily and accumulate when disposed in environment. In addition, incineration thereof emits a large quantity of carbon dioxide, which has accelerated global warming.

In consideration of such a present state, a resin composed of a non-petroleum-based raw material, or a biodegradable plastic decomposable by a microorganism has been studied actively. Most of the biodegradable plastics presently studied have an aliphatic carboxylate ester unit, and are easily decomposed of a microorganism. On the other hand, they are inferior in heat stability, and have a serious problem of decrease in molecular weight or hue deterioration in a molding process, wherein they are exposed to high temperature, such as melt spinning, injection molding, melt film formation or the like.

Among these, polylactic acid (hereafter may be referred to as PLA) is a plastic superior in heat resistance and has good balance of hue and mechanical strength. As a method for producing a homo-polymer (hereafter may be referred to as homo-PLA) of poly-L-lactic acid (hereafter may be referred to as PLLA) or poly-D-lactic acid (hereafter may be referred to as PDLA), a ring-opening polymerization method using lactide as a raw material or a direct polymerization method by dehydration condensation of lactic acid is known. In general, melting point of the above-described poly-L-lactic acid and the above-described poly-D-lactic acid is said to be around 170° C. Therefore, they have lower heat resistance as compared with a petrochemistry-based polyester represented by polyethylene terephthalate or polybutylene terephthalate, and have a problem that, for example, ironing is not applicable onto a product, in the case where thus produced poly-L-lactic acid is used as a fiber or the like. Therefore, it is a present state that further higher heat resistance is required.

In an attempt to find a breakthrough in such a state, improvement of heat resistance of polylactic acid has been studied. One of these studies includes a stereo-complex polylactic acid (hereafter may be referred to as scPLA) formed by mixing poly-L-lactic acid and poly-D-lactic acid.

However, in the case where poly-L-lactic acid and poly-D-lactic acid are mixed in a mass ratio of 1:1, only a stereo-complex crystal does not always appear, and in many cases, a homo-PLA crystal also appears at the same time, in particular, in a region of high molecular weight. In addition, it is difficult to stably form scPLA having 100% rate of content of a stereo-complex crystal by heat melting process, and such a presence of homo-PLA raised a problem of insufficient utilization of features of scPLA having high melting point. Therefore, it is strongly required to stably produce a product having 100% rate of content of scPLA, without mixed homo-PLA.

Therefore, as an alternative method for producing scPLA by mixing the above poly-L-lactic acid and poly-D-lactic acid, a method is proposed for producing a polylactic acid block copolymer, wherein the same amount of poly-L-lactic acid and poly-D-lactic acid are mixed, and the poly-L-lactic acid and poly-D-lactic acid are subjected to a reaction to form a covalent bond (for example, see JP-A-2002-356543). By this method, scPLA is preferentially generated between a chain of L-lactic acid units and a chain of D-lactic acid units, among molecules of polylactic acid block copolymers, and thus a peak derived from homo-PLA is not confirmed on a chart of a differential scanning calorimetry (DSC). Namely, a product with 100% rate of content of scPLA can be stably formed, without mixed homo-PLA.

In addition, in JP-A-2003-342836, a heat adhesive fiber is disclosed, which is a core-sheath conjugated type fiber of polylactic acid-based polymer, forming a stereo-complex, wherein a component composing the core part is obtained by blending poly-L-lactic acid having an optical purity of from 70 to 100% ee, and poly-D-lactic acid having an optical purity of from 70 to 100% ee.

DISCLOSURE OF INVENTION

However, at present, as for D-lactide or D-lactic acid, which is a raw material of the D-component, not only supply source is limited but also turn volume is small, and thus market price is higher as compared with L-lactide or L-lactic acid, which is a raw material of the L-component. Therefore, it inevitably leads to high production cost of a stereo-complex polylactic acid, having a mass ratio of the D-component and the L-component of 1:1, in the case where the D-component and the L-component are mixed in the same amount according to conventional technology.

In addition, in the above JP-A-2002-356543, a method for producing a multi-block copolymer composed of poly-L-lactic acid and poly-D-lactic acid, wherein the above multi-block copolymer is a stereo-complex polylactic acid containing only a stereo-complex crystal, is disclosed. However, re-precipitation is required by every step for increasing block number of the above multi-block copolymer, and thus has a problem of being not suitable to industrial production. Therefore, a method for producing a polylactic acid block copolymer in low cost, and whose weight average molecular weight is equal to or higher than 100,000, wherein only a stereo-complex crystal is capable of growing, even when melting and crystallization are repeated, has not yet proposed.

Furthermore, as for technology described in the above JP-A-2002-356543, in the case where blend ratio of poly-L-lactic acid and poly-D-lactic acid is outside a range of from 30/70 to 70/30 (mass ratio), there were problems that formation of a stereo-complex, which is a stereospecific bond, is inhibited, it is difficult for crystal melting initiation temperature of the resulting polylactic acid-based polymer to be equal to or higher than 180° C., and response to wide molding temperature range is not possible.

Therefore, it is an object of the present invention to provide a method for producing a polylactic acid block copolymer having high molecular weight, and in lower cost, wherein only a stereo-complex crystal is capable of growing, even when heat melting process is repeated.

The present inventors have intensively studied in consideration of the above conventional technology, and have found a way to attain the above objectives, and thus have completed the present invention.

The present inventors have astonishingly found, after intensive study without being restricted to conventional technology, that heat resistance equivalent to that of sbPLA, obtained by mixing poly-L-lactic acid and poly-D-lactic acid in the same amount, can be attained by using a production method found by the present inventors, even in biased composition ratio (mass ratio) of an L-lactic acid unit (L component) and a D-lactic acid unit (D component). In addition, the present inventors have also found that the present invention is capable of suppressing use amount of D-lactide, which leads to solve a problem of significantly reducing production cost of a stereo-complex polylactic acid, which was considered impossible to solve. Furthermore, it has found that heat resistance equivalent to that of sbPLA, obtained by mixing an L-body and a D-body in the same amount, can be attained; significant reduction of production cost is resulted in; and a product can be provided stably and in low price irrespective of variation of raw material price, by using a large quantity of a lower price raw material, even when cost structure of the L-body (poly-L-lactic acid or L-lactide) and the D-body (poly-D-lactic acid or D-lactide) will be inversed in the future.

Namely, the present invention relates to a method for producing a polylactic acid block copolymer characterized in that (i) ring-opening polymerization of D-lactide (D component) is carried out in the presence of poly-L-lactic acid (L component), or (ii) ring-opening polymerization of L-lactide (L component) is carried out in the presence of poly-D-lactic acid (D component), and mass ratio of the D component and the L component is the D component/the L component=60/40 to 91/9, or the L component/the D component=60/40 to 91/9.

In addition, the present invention relates to a method for producing a polylactic acid block copolymer characterized by containing the step for melt mixing or solution mixing (i) a first polylactic acid block copolymer, which is a polylactic acid block copolymer obtained by ring-opening polymerization of D-lactide (D component) in the presence of poly-L-lactic acid (L component), wherein mass ratio of the D component and the L component is the D component/the L component=60/40 to 91/9, and having a weight average molecular weight of from 80,000 to 500,000, and (ii) a second polylactic acid block copolymer, which is a polylactic acid block copolymer obtained by ring-opening polymerization of L-lactide (L component) in the presence of poly-D-lactic acid (D component), wherein mass ratio of the L component and the D component is the L component/the D component=60/40 to 91/9.

Furthermore, the present invention relates to a method for producing a polylactic acid block copolymer characterized by containing the step for melt mixing or solution mixing (i) a first polylactic acid block copolymer, which is a polylactic acid block copolymer obtained by ring-opening polymerization of D-lactide (D component) in the presence of poly-L-lactic acid (L component), wherein mass ratio of the D component and the L component is the L component/the D component=60/40 to 91/9, and having a weight average molecular weight of from 80,000 to 500,000, and (ii) a second polylactic acid block copolymer, which is a polylactic acid block copolymer obtained by ring-opening polymerization of L-lactide (L component) in the presence of poly-D-lactic acid (D component), wherein mass ratio of the L component and the D component is the D component/the L component=60/40 to 91/9.

Still further, the present invention relates to a polylactic acid block copolymer characterized in that mass ratio of an L-lactic acid unit and a D-lactic acid unit is the L-lactic acid unit/the D-lactic acid unit=60/40 to 91/9, or mass ratio of a D-lactic acid unit and an L-lactic acid unit is the D-lactic acid unit/the L-lactic acid unit=60/40 to 91/9, and rate of content of a stereo-complex crystal is from 80 to 100%.

Still more further, the present invention relates to a molded article containing the above polylactic acid block copolymer.

According to a production method of the present invention, a polylactic acid block copolymer having extremely high rate of content of a stereo-complex crystal can be produced, even when composition (mass ratio) of the L-component (poly-L-lactic acid or L-lactide) and a D-component (poly-D-lactic acid or D-lactide) to be used is significantly biased. Therefore, in the case where production cost and/or price difference is present between the L-component and the D-component in a production stage, by adoption of a production method of the present invention, using a cheaper one in a larger quantity, it is possible to produce and provide a product having high function and high added value, in extremely low cost and low price.

In addition, according to a production method of the present invention, it is possible to produce a polylactic acid block copolymer having high weight average molecular weight, where only a stereo-complex crystal can be grown, even when melting and crystallization are repeated, which was difficult to produce by a conventional production method.

Furthermore, a production method of the present invention is capable of controlling crystal melting point of the resulting polylactic acid block copolymer in a high temperature range, which is thus capable of furnishing superior heat resistance to the resulting polylactic acid block copolymer. Therefore, thread, film or various molded articles can be formed by melt molding of a polylactic acid block copolymer obtained by a production method of the present invention. In particular, in the case where the resulting polylactic acid block copolymer by a production method of the present invention is used as a fiber, which was conventionally unsuitable as an application of polylactic acid, it can be applied widely in any of the fiber products, because fiber cloth is not damaged, even by ironing at 160° C. or at further higher temperature (about 180° C.). In addition, because a polylactic acid block copolymer obtained by a production method of the present invention has biodegradability, an environmentally-friendly product can be provided without affecting environment even after being disposed.

Further other objectives, features and characteristics of the present invention will be made clear by referring to explanation below and preferable embodiments exemplified in accompanying drawings.

BEST MODES FOR CARRYING OUT THE INVENTION

Figure 1:
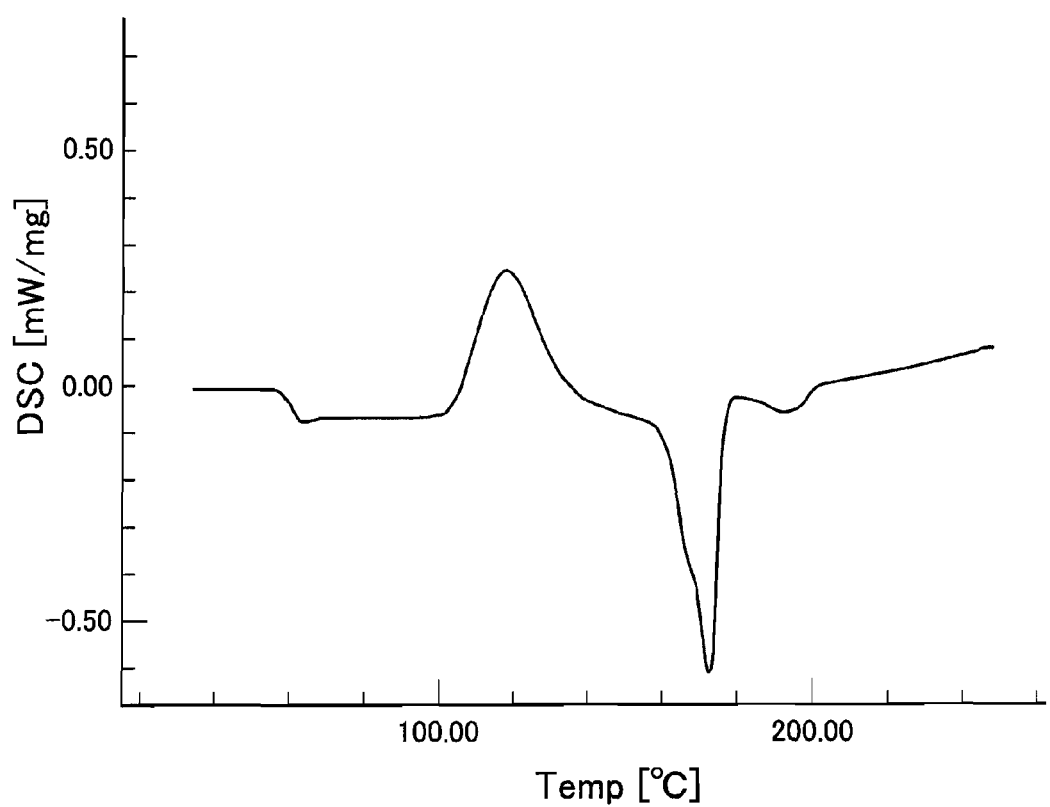
FIG. 1 is a drawing showing a DSC chart of a polylactic acid block copolymer (sample name: PLA20) obtained in Comparative Example 1 to be described later.

Explanation will be given below in detail on embodiments of the present invention.

[A Method for Producing a Polylactic Acid Block Copolymer]

A method for producing a polylactic acid block copolymer of the present invention is characterized in that (i) ring-opening polymerization of D-lactide (D component) is carried out in the presence of poly-L-lactic acid (L component), or (ii) ring-opening polymerization of L-lactide (L component) is carried out in the presence of poly-D-lactic acid (D component), and mass ratio of the D component and the L component is the D component/the L component=60/40 to 91/9, or the L component/the D component=60/40 to 91/9. Explanation will be given below by each of the constituent requirements.

(Poly-L-Lactic Acid, Poly-D-Lactic Acid)

The above (i) poly-L-lactic acid (PLLA) or the above (ii) poly-D-lactic acid (PDLA) is substantially composed of an L-lactic acid unit or a D-lactic acid unit represented by the following chemical formula (1).

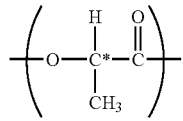

Chemical formula (1)

In the above chemical formula (1), C* represents an asymmetric carbon, and an S-configuration based on this asymmetric carbon provides an L-lactic acid unit, while an R-configuration provides a D-lactic acid unit.

The above PLLA is composed of the L-lactic acid unit in an amount of preferably from 90 to 100% by mole, more preferably from 92 to 100% by mole, and further preferably from 95 to 100% by mole, based on all the constituent units in PLLA as 100% by mole. The L-lactic acid unit in the above PLLA below 90% by mole may sometimes cause difficulty in raising melting point of the finally resulting polylactic acid block copolymer sufficiently high.

The above PLLA may contain a constituent unit other than the L-lactic acid unit. Content of the constituent unit other than the L-lactic acid unit is preferably from 10 to 0% by mole, more preferably from 8 to 0% by mole, further preferably from 5 to 0% by mole, based on all the constituent units in PLLA as 100% by mole. An example of the constituent unit other than the L-lactic acid unit, containable in PLLA, includes a D-lactic acid unit, a constituent unit derived from a compound other than lactic acid or the like.

The above PDLA is composed of the D-lactic acid unit in an amount of preferably from 90 to 100% by mole, more preferably from 92 to 100% by mole, and further preferably from 95 to 100% by mole, based on all the constituent units in PDLA as 100% by mole. The D-lactic acid unit in the above PDLA below 90% by mole may sometimes cause difficulty in raising melting point of the finally resulting polylactic acid block copolymer sufficiently high.

The above PDLA may contain a constituent unit other than the D-lactic acid unit. Content of the constituent unit other than the D-lactic acid unit is preferably from 10 to 0% by mole, more preferably from 8 to 0% by mole, further preferably from 5 to 0% by mole, based on all the constituent units in PDLA as 100% by mole. An example of the constituent unit other than the L-lactic acid unit, containable in PDLA, includes an L-lactic acid unit, a constituent unit derived from a compound other than lactic acid or the like.

An example of the constituent unit derived from the compound other than lactic acid, containable in the above PLLA or the above PDLA, preferably includes, for example, a unit derived from a dicarboxylic acid, a unit derived from a polyvalent alcohol, a unit derived from a hydroxycarboxylic acid, or a unit derived from a lactone, or a unit derived from a polyester obtained by these constituent units, a unit derived from a polyether, a unit derived from a polycarbonate, or the like, however, not limited thereto.

An example of the above dicarboxylic acid preferably includes, for example, succinic acid, adipic acid, azelaic acid, sebacic acid, terephthalic acid or isophthalic acid or the like. An example of the above polyvalent alcohol preferably includes, for example, an aliphatic polyhydric alcohol such as ethylene glycol, propylene glycol, butanediol, pentanediol, hexanediol, octanediol, glycerin, sorbitan, neopentyl alcohol, diethylene glycol, triethylene glycol, polyethylene glycol or polypropylene glycol, or the like; or an aromatic polyhydric alcohol such as bisphenol added with ethylene oxide or the like. An example of the above hydroxycarboxylic acid preferably includes, for example, glycolic acid, hydroxybutyric acid or the like. An example of the above lactone preferably includes, for example, glycolide, ε-caprolactone glycolide, ε-caprolactone, β-propiolactone, δ-butyrolactone, β- or γ-butyrolactone, pivalolactone or δ-valerolactone or the like.

In view of obtaining a polymer having higher melting point, mass ratio of the L-lactic acid unit and D-lactic acid unit in the above PLLA is preferably in a range of the L-lactic acid unit/D-lactic acid unit=95/5 to 100/0, and mass ratio of the D-lactic acid unit and L-lactic acid unit in the above PDLA is preferably in a range of the D-lactic acid unit/L-lactic acid unit=95/5 to 100/0.

Weight average molecular weight of the above PLLA or the above PDLA is preferably from 7,000 to 450,000 and more preferably from 7,000 to 200,000. The weight average molecular weight of the above PLLA or the above PDLA outside the above range may sometimes make difficult to obtain rate of content of a stereo-complex crystal in a polylactic acid block copolymer, obtained by a production method of the present invention, equal to or higher than 80%. It should be noted, as the above weight average molecular weight in the present invention, value measured by GPC (gel permeation chromatography) and converted to polystyrene should be adopted.

A method for obtaining the above PLLA or the above PDLA is not especially limited, and includes, for example, a method for dehydration and condensation of L-lactic acid or D-lactic acid; a method for ring-opening polymerization of L-lactide or D-lactide; or the like, however, a method for ring-opening polymerization of L-lactide or D-lactide is preferable, because a high molecular weight polymer is easily obtained and control of molecular weight is easy.

Purity of L-lactide or D-lactide to be used in order to obtain the above PDLA or the above PLLA is not especially limited, however, in view of obtaining a polymer having high molecular weight, a free acid contained in the above L-lactide or the above D-lactide is preferably equal to or lower than 10% by mass, more preferably equal to or lower than 1% by mass, further preferably equal to or lower than 0.15% by mass and particularly preferably equal to or lower than 0.05% by mass, relative to 100% by mass of the above L-lactide or the above D-lactide. The free acid in the above L-lactide or the above D-lactide over 10% by mass may sometimes inhibit progress of a ring-opening polymerization reaction. A method for purification of the above L-lactide or the above D-lactide is not especially limited and, for example, a conventionally known method such as crystallization, distillation or the like; a method described in JP-A-2004-149418; a method described in JP-A-2004-149419; or the like can be adopted as appropriate.

The above ring-opening polymerization can be carried out in the presence of an organic solvent and a polymerization catalyst. The above polymerization catalyst is not especially limited as long as being capable of advancing a polymerization reaction, and preferably includes, for example, a compound containing at least one kind of an metal element selected from the group consisting of the second group elements, rare earth metals, the fourth periodic transition metals, aluminum, germanium, tin and antimony. As an example of the above second group elements, magnesium, calcium, strontium or the like is included. As an example of the above rare earth metals, scandium, yttrium, lanthanum, cerium or the like is included. As an example of the above the fourth periodic transition metals, iron, cobalt, nickel, zinc, titanium or the like is included.

As an example of the polymerization catalyst containing the above metal element, a carboxylate of a metal exemplified above, an alcoxide of a metal exemplified above, an aryloxide of a metal exemplified above, or an enolate of a β-diketone of a metal exemplified above or the like is preferably included, which may be used alone or in combination of two or more kinds. In consideration of polymerization activity or hue, the polymerization catalyst containing the above metal element is preferably at least one kind selected from the group consisting of tin 2-ethylhexanoate, titanium tetraisopropoxide and aluminium triisopropoxide.

Use amount of the polymerization catalyst containing the above metal element is preferably from 0.001 to 0.5 part by mass, more preferably from 0.001 to 0.1 part by mass and further preferably from 0.003 to 0.01 part by mass, relative to 100 parts by mass of the above L-lactide or the above D-lactide. The use amount of the polymerization catalyst, containing the above metal element, below 0.001 part by mass, relative to 100 parts by mass of the above L-lactide or the above D-lactide, retards progress of the reaction, and may sometimes provide insufficient effect of reducing production cost of a polylactic acid block copolymer obtained by a production method of the present invention, wherein composition ratio (mass ratio) of the L-component (poly-L-lactic acid or L-lactide) and the D-component (poly-D-lactic acid or D-lactide) is produced in a significantly biased state. On the other hand, the use amount of the polymerization catalyst, containing the above metal element, over 0.5 part by mass, relative to 100 parts by mass of the above L-lactide or the above D-lactide, makes control of the reaction difficult and may sometimes increase racemization or dispersion degree, and could significantly increase coloring of the resulting polymer, or could limit applications of the resulting polymer.

In the case where the ring-opening polymerization is carried out in the presence of the polymerization catalyst containing the above metal element, a polymerization initiator may be used. As an example of the above polymerization initiator, an alcohol compound or the like is included. The above alcohol compound is preferably one not to inhibit polymerization of lactic acid and a non-volatile one. As a specific example thereof, for example, decanol, dodecanol, tetradecanol, hexadecanol, octadecanol or lauryl alcohol or the like is included, and they may be used alone or in combination of two or more kinds.

Use amount of the above polymerization initiator is preferably from 0 to 20 parts by mass, and more preferably from 0.1 to 15 parts by mass, relative to 100 parts by mass of the above L-lactide or the above D-lactide. The use amount of the above polymerization initiator over 20 parts by mass relative to 100 parts by mass of the above L-lactide or the above D-lactide, may cause difficulty in obtaining a polymer having objective molecular weight.

Atmosphere of the ring-opening polymerization of the above L-lactide or the above D-lactide in the presence of the polymerization catalyst containing the above metal element is not especially limited, however, inert gas atmosphere such as nitrogen gas, argon gas or the like is preferable, due to suppressing coloring of a product or the like.

Reaction time of the ring-opening polymerization of the above L-lactide or the above D-lactide, in the presence of the polymerization catalyst containing the above metal element, is preferably from 15 minutes to 5 hours, and more preferably from 30 minutes to 2 hours. The above reaction time below 15 minutes provides an insufficient reaction and may sometimes not provide an objective polymer, while the above reaction time over 5 hours may sometimes increase coloring or dispersion degree of the resulting polymer.

Reaction temperature of the ring-opening polymerization of the above L-lactide or the above D-lactide, in the presence of the polymerization catalyst containing the above metal element, is preferably from 100 to 250° C., more preferably from 150 to 230° C., and further preferably from 170 to 230° C. The reaction temperature below 100° C. retards progress of the reaction, and may sometimes provide insufficient effect of reducing production cost of a polylactic acid block copolymer obtained by a production method of the present invention, wherein composition ratio (mass ratio) of the L-component (poly-L-lactic acid or L-lactide) and the D-component (poly-D-lactic acid or D-lactide) is produced in a significantly biased state. The reaction temperature over 250° C. makes reaction control difficult and could increase racemization or dispersion degree, and could significantly increase coloring of the resulting polymer, or could limit applications of the resulting polymer.

Reaction pressure of the ring-opening polymerization of the above L-lactide or the above D-lactide, in the presence of the polymerization catalyst containing the above metal element, is not especially limited as long as being within a range that is capable of advancing the ring-opening polymerization in a solution, and the reaction may be carried out under any of atmospheric pressure, reduced pressure and pressurization. In view of non-requirement of a pressure-proof production apparatus, and contribution to reduction of production cost, the reaction is preferably carried out under atmospheric pressure.

The ring-opening polymerization the above L-lactide or the above D-lactide, in the presence of the polymerization catalyst containing the above metal element, can be carried out using a conventionally known production apparatus, for example, a vertical type reactor equipped with a stirring blade for high viscosity, such as a helical ribbon blade or the like.

The above PLLA is preferably one obtained by removing excess lactide after the ring-opening polymerization of L-lactide. Similarly, the above PDLA is preferably one obtained by removing excess lactide after the ring-opening polymerization D-lactide. It is preferable because removal of excess lactide from the above PLLA or the above PDLA is capable of making melting point of the finally resulting polylactic acid block copolymer high.

A method for removing excess lactide is not especially limited, and it may be carried out by an operation of, for example, reducing pressure inside a reaction system, washing (purification) with an organic solvent or the like, however, it is preferably carried out by reducing pressure inside a reaction system, in view of operational simplicity.

Condition for such reduced pressure is not especially limited, and it is preferable that temperature inside the system after completion of the polymerization reaction is set in a range of preferably from 130 to 250° C., and more preferably from 150 to 230° C.; and pressure inside the system is preferably set to equal to or lower than 70 kPa. The reaction temperature below 130° C. increases viscosity inside the system or solidifies inside the system, which may sometimes make operation of an apparatus difficult. On the other hand, the reaction temperature over 250° C. advances a depolymerization reaction of lactide, and may sometimes increase dispersion degree of the resulting PLLA or PDLA. In addition, the pressure inside the system over 70 kPa may sometimes provide insufficient removal of lactide.

Atmosphere in reducing pressure is not especially limited, however, in view of suppressing decomposition of residual lactide or coloring of a polymer, it is preferable to be inert gas atmosphere such as nitrogen gas, argon gas or the like.

In addition, too high residual amount of lactide in the above PLLA or the above PDLA may sometimes lower melting point of the finally resulting polylactic acid block copolymer, therefore the above PLLA or the above PDLA preferably has low content of L-lactide or D-lactide, irrespective of presence or absence of removal processing of excess lactide as above. Namely, content of L-lactide in the above poly-L-lactic acid, before carrying out ring-opening polymerization of D-lactide in the presence of the poly-L-lactic acid, is preferably from 0 to 5% by mass, more preferably from 0 to 1% by mass, further preferably from 0 to 0.5% by mass and particularly preferably from 0 to 0.1% by mass, relative to mass of the above poly-L-lactic acid. In addition, content of D-lactide in the above poly-D-lactic acid, before carrying out ring-opening polymerization of L-lactide in the presence of the poly-D-lactic acid, is preferably from 0 to 5% by mass, more preferably from 0 to 1% by mass, further preferably from 0 to 0.5% by mass and particularly preferably from 0 to 0.1% by mass, relative to mass of the above poly-D-lactic acid. The content of the above L-lactide in the above poly-L-lactic acid, or the content of the D-lactide in the above poly-D-lactic acid over 5% by mass may sometimes lowers melting point of the finally resulting polylactic acid block copolymer.

(Ring-Opening Polymerization of D-Lactide of L-Lactide)

After obtaining the above poly-L-lactic acid or the above poly-D-lactic acid, (i) ring-opening polymerization of D-lactide in the presence of the above poly-L-lactic acid may be carried out, or (ii) ring-opening polymerization of L-lactide in the presence of the above poly-D-lactic acid may be carried out. Here, explanation will be given on the ring-opening polymerization of the D-lactide or the L-lactide, after obtaining the above poly-L-lactic acid or the above poly-D-lactic acid.

Purity of the above D-lactide is preferably from 90 to 100% by mole, more preferably from 92 to 100% by mole, and further preferably from 95 to 100% by mole, based on total mole number of the D-lactide as 100% by mole. Content of components other than the D-lactide is preferably from 10 to 0% by mole, more preferably from 8 to 0% by mole, and further preferably from 5 to 0% by mole. The purity of the above D-lactide below 90% by mole may sometimes cause difficulty in making rate of content of a stereo-complex crystal in a polylactic acid block copolymer, produced by a production method of the present invention, to be equal to or higher than 80%. An example of other components containable in the above D-lactide includes L-lactide, L-lactic acid, a dicarboxylic acid, a polyvalent alcohol, a hydroxycarboxylic acid, or a lactone or the like. A specific example of the above dicarboxylic acid, the above polyvalent alcohol, the above hydroxycarboxylic acid, or the above lactone is as described already and thus explanation thereof is omitted here.

Purity of the above L-lactide is preferably from 90 to 100% by mole, more preferably from 92 to 100% by mole, and further preferably from 95 to 100% by mole, based on total mole number of the L-lactide as 100% by mole. Content of components other than the L-lactide is preferably from 10 to 0% by mole, more preferably from 8 to 0% by mole, and further preferably from 5 to 0% by mole. The purity of the above L-lactide below 90% by mole may sometimes cause difficulty in making rate of content of a stereo-complex crystal in a polylactic acid block copolymer, produced by a production method of the present invention, to be equal to or higher than 80%. An example of other components containable in the above L-lactide includes D-lactide, D-lactic acid, a dicarboxylic acid, a polyvalent alcohol, a hydroxycarboxylic acid, or a lactone or the like. A specific example of the above dicarboxylic acid, the above polyvalent alcohol, the above hydroxycarboxylic acid, or the above lactone is as described already and thus explanation thereof is omitted here.

Content of a free acid in the above D-lactide or the above L-lactide is preferably equal to or lower than 10% by mass, more preferably equal to or lower than 1% by mass, further preferably equal to or lower than 0.15% by mass and particularly preferably equal to or lower than 0.05% by mass. The content of the free acid over 10% by mass makes difficult to obtain a finally resulting polymer with high molecular weight, and may sometimes restrict applications of the resulting polymer.

Optical purity of the D-lactide or the L-lactide is in a range of from 90 to 100% ee, more preferably from 95 to 100% ee, and further preferably from 98 to 100% ee, in view of obtaining a copolymer with higher melting point. The above optical purity below 90% ee may sometimes result in reduction of melting point and crystal melting enthalpy of the resulting polymer. It should be noted, in the present invention, as the above optical purity, value measured by a method described in Examples to be described below, should be adopted.

The ring-opening polymerization of the above D-lactide or the ring-opening polymerization of the above L-lactide may be carried out by a method similar to a method explained in the paragraph of poly-L-lactic acid or poly-D-lactic acid. Namely, kind or purity of a raw material lactide to be subjected to the ring-opening polymerization, kind or use amount of various additives such as a polymerization catalyst, a polymerization initiator or the like, reaction conditions (temperature, time, pressure, atmosphere or the like), a reaction apparatus, removal of excess lactide after polymerization or the like is as explained in the paragraph of the above poly-L-lactic acid or the above poly-D-lactic acid, and thus explanation thereof is omitted here.

It should be noted, as for reaction temperature among the above reaction conditions, same condition as in production of the above poly-L-lactic acid or the above poly-D-lactic acid can be adopted, however, it is preferably set by suitable selection of a polymerization method among melt polymerization, solid phase polymerization, or by combination thereof, depending on melting point of a finally resulting block copolymer, or residual amount of lactide in the above poly-L-lactic acid or the above poly-D-lactic acid. In addition, in the present ring-opening polymerization after producing PLLA or PDLA, a polymerization catalyst may be added or may not be added.

The addition amount of D-lactide or L-lactide in the ring-opening polymerization of the D-lactide or L-lactide, after obtaining the above poly-L-lactic acid or the above poly-D-lactic acid, may be determined so that mass ratio of an L-lactic acid unit and a D-lactic acid unit (the L-lactic acid unit/the D-lactic acid unit), or mass ratio of a D-lactic acid unit and an L-lactic acid unit (the D-lactic acid unit/the L-lactic acid unit) in the finally resulting polylactic acid block copolymer, to be described below, is within a range to be described below. Therefore, in the case where ring-opening polymerization of D-lactide (D component) is carried out in the presence of poly-L-lactic acid (L component), mass ratio of the D component and the L component is the D component/the L component=60/40 to 91/9, or the L component/the D component=60/40 to 91/9, and the D component/the L component=60/40 to 91/9 is preferable. In view of increasing crystal melting enthalpy and enhancing heat resistance of the finally resulting polylactic acid block copolymer, it is preferable that mass ratio of the above L component and the above D component is the D component/the L component=71/29 to 91/9, or the L component/the D component=71/29 to 91/9, and in view of obtaining a polymer having higher molecular weight, the D component/the L component=71/29 to 91/9 is more preferable. In the case where mass ratio of the D component and the L component is 91/9<the D component/the L component, it may be difficult in some cases to produce a polylactic acid block copolymer having rate of content of a stereo-complex crystal equal to or higher than 80%, and it may be difficult in some cases to produce a polylactic acid block copolymer having higher melting point. In addition, in the case where mass ratio of the D component and the L component is 40/60<the D component/the L component<60/40, it is difficult for composition of the D component (poly-D-lactic acid or D-lactide) and the L component (poly-L-lactic acid or L-lactide) to be biased, and thus when price difference between the D component and the L component is large, it may be difficult in some cases to stably produce a high value added product in low cost.

In addition, in the case where ring-opening polymerization of L-lactide (L component) is carried out in the presence of poly-D-lactic acid (D component), mass ratio of the D component and the L component is the D component/the L component=60/40 to 91/9, or the L component/the D component=60/40 to 91/9, and the L component/the D component=60/40 to 91/9 is preferable. In view of increasing crystal melting enthalpy and enhancing heat resistance of the finally resulting polylactic acid block copolymer, it is preferable that mass ratio of the above L component and the above D component is the D component/the L component=71/29 to 91/9, or the L component/the D component=71/29 to 91/9, and in view of obtaining a polymer having higher molecular weight, the L component/the D component=71/29 to 91/9 is more preferable. In the case where mass ratio of the L component and the D component is 91/9<the L component/the D component, it may be difficult in some cases to produce a polylactic acid block copolymer having rate of content of a stereo-complex crystal equal to or higher than 80%, and it may be difficult in some cases to produce a polylactic acid block copolymer having higher melting point. In addition, in the case where mass ratio of the D component and the L component is 40/60<the L component/the D component<60/40, it is difficult for composition of the L component (poly-L-lactic acid or L-lactide) and the D component (poly-D-lactic acid or D-lactide) to be biased, and thus when price difference between the L component and the D component is large, it may be difficult in some cases to stably produce a high value added product in low cost.

Atmosphere of a polymerization reaction is preferably inert gas atmosphere such as nitrogen gas, argon gas or the like, in view of suppressing coloring of the resulting polymer.

By adoption of a method as above, a polylactic acid block copolymer having high molecular weight, and only a stereo-complex crystal is capable of growing, even when melting and crystallization are repeated, can be obtained.

A polylactic acid block copolymer obtained by the above production method of the present invention has weight average molecular weight (Mw) of preferably from 80,000 to 500,000, more preferably from 100,000 to 400,000, and further preferably from 100,000 to 300,000. The weight average molecular weight within the above range is capable of providing a polylactic acid block copolymer superior in mechanical strength and moldability.

A polylactic acid block copolymer obtained by the above production method of the present invention has crystal melting point, which is observed in the temperature raising step, by three times repetition of a program composed of the temperature raising step from 30 to 250° C., and the quenching step from 250 to 30° C., in a differential scanning calorimetry (DSC), preferably in a range of from 190 to 250° C., more preferably from 195 to 250° C. and further preferably from 200 to 250° C.

In addition, rate of content of a stereo-complex crystal of a polylactic acid block copolymer obtained by the above production method of the present invention, is preferably from 80 to 100%, more preferably from 90 to 100% and further preferably from 95 to 100%. Furthermore, melting enthalpy (ΔHms) of a stereo-complex crystal of a polylactic acid block copolymer of the present invention, which appears at from 190 to 250° C., is preferably equal to or higher than 10 J/g, more preferably equal to or higher than 20 J/g and further preferably equal to or higher than 30 J/g. In the case where crystal melting point of a stereo-complex crystal is still within the above range, even after repeating a program as above three times, it means that only a stereo-complex crystal grows, even when melting and crystallization are repeated. In the case where the crystal melting point, which is observed during temperature raising process, in repeated process of a program of the above melting and crystallization three times, is below 190° C., performance as a polylactic acid block copolymer, which forms a stereo-complex, may be reduced in some cases. On the other hand, the crystal melting point over 250° C. reduces molecular weight by thermal decomposition of a polylactic acid block copolymer in molding process and thus may sometimes impair mechanical characteristics. It should be noted, in the present invention, as rate of content of the above stereo-complex crystal, value calculated by a method described in Examples, to be described later, should be adopted.

For a polylactic acid block copolymer, obtained by a production method of the present invention, to exhibit superior heat resistance, it is preferable that rate of content of the above stereo-complex crystal, melting point of the above stereo-complex crystal, and melting enthalpy of the above stereo-complex crystal are within the above range.

A second aspect of the present invention is a polylactic acid block copolymer characterized in that mass ratio of the L-lactic acid unit and the D-lactic acid unit is the L-lactic acid unit/the D-lactic acid unit=60/40 to 91/9, or mass ratio of the D-lactic acid unit and the L-lactic acid unit is the D-lactic acid unit/the L-lactic acid unit=60/40 to 91/9, and rate of content of a stereo-complex crystal is from 80 to 100%.

Mass ratio of the L-lactic acid unit and the D-lactic acid unit in the above polylactic acid block copolymer is the L-lactic acid unit/the D-lactic acid unit=60/40 to 91/9, or the D-lactic acid unit/the L-lactic acid unit=60/40 to 91/9, and preferably the L-lactic acid unit/the D-lactic acid unit=71/29 to 91/9, or the D-lactic acid unit/the L-lactic acid unit=71/29 to 91/9, and more preferably the L-lactic acid unit/the D-lactic acid unit=71/29 to 85/15, or the D-lactic acid unit/the L-lactic acid unit=71/29 to 85/15. In the case where mass ratio of the L-lactic acid unit and the D-lactic acid unit is 91/9<the L-lactic acid unit/the D-lactic acid unit or, 91/9<the D-lactic acid unit/the L-lactic acid unit, it may sometimes significantly reduce rate of content of the stereo-complex crystal in the resulting polylactic acid block copolymer. On the other hand, in the case where 40/60<the L-lactic acid unit/the D-lactic acid unit<60/40, it becomes difficult for composition of the L component (poly-L-lactic acid or L-lactide) and the D component (poly-D-lactic acid or D-lactide) to be biased, and therefore when price difference between the L component and the D component is large, it may sometimes become difficult to stably produce a high value added product in low cost.

In addition, a polylactic acid block copolymer having high rate of content of a stereo-complex crystal also can be obtained by melt mixing or solution mixing of two kinds of polylactic acid block copolymers obtained by a production method as above. Namely, the present invention provides a method for producing a polylactic acid block copolymer, characterized by containing the step for melt mixing or solution mixing of (i) a first polylactic acid block copolymer, that is a polylactic acid block copolymer obtained by ring-opening polymerization of D-lactide (D component) in the presence of poly-L-lactic acid (L component), wherein mass ratio of the above D component and the above L component is the D component/the L component=60/40 to 91/9, and (ii) a second polylactic acid block copolymer, that is a polylactic acid block copolymer obtained by ring-opening polymerization of L-lactide (L component) in the presence of poly-D-lactic acid (D component), wherein mass ratio of the L component and the D component is the L component/the D component=60/40 to 91/9.

Furthermore, the present invention provides a method for producing a polylactic acid block copolymer, characterized by containing the step for melt mixing or solution mixing of (i) a first polylactic acid block copolymer, that is a polylactic acid block copolymer obtained by ring-opening polymerization of D-lactide (D component) in the presence of poly-L-lactic acid (L component), wherein mass ratio of the above L component and the above D component is the L component/the D component=60/40 to 91/9, and (ii) a second polylactic acid block copolymer, that is a polylactic acid block copolymer obtained by ring-opening polymerization of L-lactide (L component) in the presence of poly-D-lactic acid (D component), wherein mass ratio of the D component and the L component is the D component/the L component=60/40 to 91/9.

Explanation will be given below on the above melt mixing and the above solution mixing.

(Melt Mixing)

The above melt mixing is a method for mixing the first polylactic acid block copolymer and the second polylactic acid block copolymer in a melt state.

Melting temperature may be any level as long as the above first polylactic acid block copolymer and the second polylactic acid block copolymer can melt, however, it is preferably as low as possible in a degree that a molten mixture does not solidify, to suppress a decomposition reaction during melt mixing. Therefore, melting is preferably carried out in a temperature range between lower limit temperature, which is set as higher temperature between melting points of the above first polylactic acid block copolymer and the above second polylactic acid block copolymer, and upper limit temperature, which is set to be preferably higher than the lower limit temperature by 50° C., more preferably by 30° C. and particularly preferably by from 10 to 20° C. Further specifically, melt mixing is preferably carried out at 150 to 220° C.

Atmosphere in melt mixing is not especially limited, and may be under any condition of normal pressure and reduced pressure. In the case of normal pressure, flow condition of inert gas such as nitrogen gas, argon gas or the like is preferable. In addition, to remove a monomer generating by decomposition during melting, reduced pressure is preferable.

Charging order of the above first polylactic acid block copolymer and the above second polylactic acid block copolymer into an apparatus or the like in melt mixing is not especially limited. For example, the above first polylactic acid block copolymer and the above second polylactic acid block copolymer may be simultaneously charged into the mixing apparatus; or the above second polylactic acid block copolymer may be charged and mixed after melting the above first polylactic acid block copolymer. In these cases, each of the components may take any of powder-like, granule-type or pellet-like shape or the like. As an example of the apparatus, which can be used in melt mixing, for example, a mill roll, a mixer, a single or twin screw extruder, or a batch type container which can be heated, or the like is included.

Mixing time in melt mixing is preferably from 1 to 60 minutes, and more preferably from 1 to 10 minutes.

(Solution Mixing)

The above solution mixing is a method for dissolving the above first polylactic acid block copolymer and the above second polylactic acid block copolymer into a solvent and mixing thereof, and subsequently removing the solvent.

The solvent used in this case is not especially limited as long as one capable of dissolving the above first polylactic acid block copolymer and the above second polylactic acid block copolymer. As a specific example, for example, chloroform, methylene chloride, dichloroethane, tetrachloroethane, phenol, tetrahydrofuran, N-methylpyrrolidone, N,N-dimethylformamide, butyrolactone, trioxane or hexafluoroisopropanol or the like is included, and these solvents may be used alone or by mixing two or more kinds.

Content of the above first polylactic acid block copolymer and the above second polylactic acid block copolymer in the solution is set so that either one or both of the above first polylactic acid block copolymer and the above second polylactic acid block copolymer are within a range of from 1 to 30 parts by mass, more preferably from 1 to 10 parts by mass, relative to 100 parts by mass of the solvent.

Mixing may be carried out by dissolving the above first polylactic acid block copolymer and the above second polylactic acid block copolymer each in the solvent, and mixing thereof; or after dissolving either one of the above first polylactic acid block copolymer and the above second polylactic acid block copolymer in the solvent, by adding the other to mix. Removal of the solvent used in a solution may be carried out by heating, removal under reduced pressure, extraction, or combination thereof.

Mixing temperature in solution mixing is preferably from 10 to 110° C., and more preferably from 10 to 30° C. In addition mixing time is preferably from 1 to 60 minutes, and more preferably from 1 to 10 minutes.

Mixing ratio of the above first polylactic acid block copolymer and the above second polylactic acid block copolymer is preferably the first polylactic acid block copolymer/the above second polylactic acid block copolymer=90/10 to 10/90, more preferably the first polylactic acid block copolymer/the above second polylactic acid block copolymer=75/25 to 25/75, and further preferably the first polylactic acid block copolymer/the above second polylactic acid block copolymer=60/40 to 40/60.

In addition, as the above first polylactic acid block copolymer and the above second polylactic acid block copolymer, one subjected to various terminal sealing may be used. It is preferable because hydrolysis resistance or melt stability of a polylactic acid block copolymer can be improved by subjecting a reactive terminal such as a carboxyl group, or hydroxyl group or the like in the polylactic acid block copolymer to a reaction with a terminal sealing agent to seal the terminal. As an example of such a terminal sealing group, an acetyl group, an ester group, an ether group, an amide group, or a urethane group or the like is included. As an example of the above terminal sealing agent, for example, an aliphatic alcohol, a carbodiimide compound, an oxazoline compound, an oxazine compound, or an epoxy compound or the like is included.

Rate of content of a stereo-complex crystal of the polylactic acid block copolymer, obtained by melt mixing or solution mixing of two kinds of polylactic acid block copolymers as above, is from 80 to 100%, more preferably from 90 to 100% and further preferably from 95 to 100%.

Into a polylactic acid block copolymer of the present invention, usual additives, for example, a plasticizer, an antioxidant, a light stabilizer, an ultraviolet absorber, a heat stabilizer, a lubricant, a mold releasing agent, various fillers, an antistatic agent, a flame retardant, a foaming agent, a packing material, an antibacterial and antifungal agent, a nucleus formation agent, a dye, a colorant including a pigment or the like may be added as desired within a range not to impair objectives of the present invention.

A polylactic acid block copolymer of the present invention can be molded by a conventionally known method such as injection molding, extrusion molding, blow molding, foam molding, pressure forming, or vacuum forming or the like. Namely, a third aspect of the present invention is a molded article containing the above polylactic acid block copolymer. As an example of the molded article obtained by the above molding method, for example, film, sheet, fiber, cloth, non-woven fabric, agricultural material, gardening material, fishing material, civil engineering and construction material, stationery, medical supplies, or electric/electronics parts or the like is included.

Examples

The present invention will be explained specifically below with reference to Examples, however, the present invention should not be limited thereto. It should be noted measurements of characteristic values or the like in Production Examples, Examples, and Comparative Examples were carried out by the following methods.

(1) Optical Purity of Lactide

Based on 0.1 g of a sample, 100 mL of distilled water and 1.2 mL of 1N NaOH aqueous solution were added and stirred under heating at 95° C. This solution was injected into high performance liquid chromatograph (HPLC), and optical purity was calculated by peak areas derived from L-lactic acid (an L-lactic acid unit) and D-lactic acid (a D-lactic acid unit), detected by UV light (a wavelength of 254 nm). Measurement conditions are as shown in Table 1, and a calculation method for optical purity of lactide is as shown by the following numerical equation 1.

TABLE 1

| | |
|---|---|
| Pump: | LC-6A manufactured by Shimadzu Corp. |
| Detector: | SPD-6AV manufactured by Shimadzu Corp. |
| Oven: | CTO-6A manufactured by Shimadzu Corp. |
| Recording apparatus: | CR-5A manufactured by Shimadzu Corp. |
| Column: | SUMICHIRAL OA-5000 manufactured by Sumika Chemical Analysis Service, Ltd. |
| Eluting solvent: | 1 mmol aqueous solution of copper sulfate |
| Measurement method: | 20 µL of an aqueous solution of a sample in a concentration of 20 mg/mL was charged, under conditions of an oven temperature of 40° C., a detector wavelength of 254 nm and a flow rate of an eluting solvent of 1.0 ml/min. |

Expression 1

Optical purity of lactide (% $ee$)=|(peak area of $L$-lactic acid unit)−(peak area of $D$-lactic acid unit)|/|(peak area of $L$-lactic acid unit)+(peak area of $D$-lactic acid unit)|×100     Numerical equation 1

(2) Weight Average Molecular Weight (Mw)

Mw was measured using gel permeation chromatography (GPC) and converted to polystyrene. Measurement conditions are as a shown in Table 2.

TABLE 2

| | |
|---|---|
| Detector: | RID-10A (a differential refractometer) manufactured by Shimadzu Corp. |
| Pump: | LC-6A manufactured by Shimadzu Corp. |
| Oven: | CTO-6A manufactured by Shimadzu Corp. |
| Recording apparatus: | CR-7A manufactured by Shimadzu Corp. |
| Mw calculation: | a GPC program for CR-7A manufactured by Shimadzu Corp. |
| Column: | TSKgelG3000HXL, TSKgel3000HXL, TSKG4000HXL, TSKgelG5000HXL, and TSK guard column HXL, all of which manufactured by Tosoh Corp., were connected in series. |
| Eluting solvent: | chloroform (for high-performance liquid chromatography manufactured by Junsei Chemical Co., Ltd.) |
| Measurement method: | 20 µL of a solution of a sample, in a concentration of 20 mg/mL, dissolved in a mixed solvent of 1,1,1,3,3,3-hexafluoro-2-propanol and chloroform was charged, under conditions of an oven temperature of 40° C., and a flow rate of an eluting solvent of 1.0 ml/min. |

(3) Charge Ratio of an L Component and a D Component

In the column "Charge mass ratio (L component/D component)" in Table 6, charge mass ratio of polylactic acid obtained in advance and lactide to be added afterward was listed.

(4) Mass Ratio of an L Component and a D Component in a Polymer

Based on 0.1 g of a sample, 5 mL of a 5N NaOH aqueous solution and 2.5 mL of isopropanol were added, and after hydrolysis while stirring by heating at 30° C., the solution was neutralized with 1 M sulfuric acid. The resulting neutralized solution (1 mL) was diluted 25 times to adjust concentration thereof. This diluted solution was injected into high performance liquid chromatograph (HPLC), and mass ratio was calculated by peak areas derived from L-lactic acid (the L-lactic acid unit) and D-lactic acid (the D-lactic acid unit), detected by UV light (a wavelength of 254 nm). Measurement conditions are as shown in Table 1.

(5) Content of Lactide in a Polymer

Content (unit: % by mass) of lactide in a polymer was measured using a gas chromatograph. Measurement conditions are as shown in Table 3.

TABLE 3

| | |
|---|---|
| Apparatus: | GC-14B manufactured by Shimadzu Corp. |
| Detector: | FID |
| Hydrogen pressure: | 60 kPa |
| Air pressure: | 50 kPa |
| Column oven temperature: | 175° C. |
| Detector temperature: | 200° C. |
| Injection temperature: | 200° C. |
| Carrier gas: | helium |
| Carrier gas flow rate: | 50 mL/min |
| Column: | One prepared by mixing FAL-M10% Shimalite (registered trademark) TPA 60-80 mesh, and Tenax (registered trademark) TA 60-80 mesh, in a volume ratio of 1:1, was filled into a glass column having an inner diameter of 2.6 mm and a length of 1.5 m. |
| Recorder: | CR-7A manufactured by Shimadzu Corp. |
| Quantitative determination method: | Based on 1 g of a polymer sample, 0.58 g of triethylene glycol was added, and they were dissolved into 25 mL of chloroform, which solution was then injected in an amount of 1 μL for measurement. |

(6) Thermal Characteristics

A differential scanning calorimeter (DSC-60 manufactured by Shimadzu Corp.) was used. Ten mg of a sample was put in an aluminum pan to measure crystal melting heat ($\Delta Hms$) and crystal melting point (Tm) under nitrogen gas flow in 50 mL/min, by a method described in Table 4 below. Melt enthalpy of each crystal was calculated by area of region surrounded by a crystal melt peak appeared in a DSC chart and a base line.

TABLE 4

| |
|---|
| (a) Raise temperature from 30 to 250° C. in a rate of 10° C./min. |
| (b) Cool down to 30° C. using dry ice, after reaching 250° C. |
| (c) Repeat the above (a) and (b) three times. |

(7) Rate of Content of a Stereo-Complex Crystal

Rate of content of a stereo-complex crystal was calculated from homo-crystal melting heat ($\Delta Hmh$) appearing at from 150 to 190° C., and stereo-complex crystal melting heat ($\Delta Hms$) appearing at from 190 to 250° C., obtained by DSC analysis, using the following numerical equation 2, wherein homo-crystal melting heat ($\Delta Hmh^0$) of a 100% crystallized polylactic acid block copolymer was set to be $-203.4$ J/g, and stereo-complex crystal melting heat ($\Delta Hms^0$) of a 100% crystallized polylactic acid block copolymer was set to be $-142$ J/g.

Expression 2

Rate of content of a stereo-complex crystal (%)=
[($\Delta Hms/\Delta Hms^0$)/{($\Delta Hmh/\Delta Hmh^0$)+($\Delta Hms/\Delta Hms^0$)}]×100      Numerical equation 2

Manufacturing Examples of Homo-PLA

Production Example 1

Into a reactor equipped with a stirring apparatus, 100 parts by mass of L-lactide (a polymerization grade having an optical purity of 100% ee, manufactured by Musashino Chemical Laboratory, Ltd.), and 5 parts by mass of lauryl alcohol, as a polymerization initiator, were charged, and purging with nitrogen was carried out three times, followed by melting at 190° C. and adding 0.010 part by mass of tin 2-ethylhexanoate, as a polymerization catalyst, to carry out ring-opening polymerization of L-lactide under stirring for 3 hours.

After completion of the ring-opening polymerization reaction, a reaction product was taken out from the reactor as a melt state and cooled to prepare a plate-like reaction product. Then, the plate-like reaction product was crushed, and charged into the reactor equipped with the stirring apparatus, and subjected to reduced pressure processing at 120° C. under 1.33 kPa, and excess L-lactide was removed to yield poly-L-lactic acid (sample name: PLA10). Mw and mass ratio of the L-lactic acid unit and the D-lactic acid unit of the resultant PLA10 were measured. Measurement results are shown in Table 5. The resultant PLA10 was composed of 100% by mole of the L-lactic acid unit, and content of L-lactide in the resultant PLA10 was 0.8% by mass.

Production Example 2

Similar operation as in Production Example 1 was carried out except that D-lactide (having an optical purity of 99.8% ee, manufactured by Musashino Chemical Laboratory, Ltd.) was used instead of L-lactide, to yield PLA11. Mw and mass ratio of the L-lactic acid unit and the D-lactic acid unit of the resultant PLA11 were measured. Measurement results are shown in Table 5. The resultant PLA11 was composed of 99.9% by mole of the D-lactic acid unit, and content of D-lactide in the resultant PLA11 was 0.5% by mass.

Production Example 3

Similar operation as in Production Example 1 was carried out except that amount of lauryl alcohol was changed to 1 part by mass to yield PLA12. Mw and mass ratio of the L-lactic acid unit and the D-lactic acid unit of the resultant PLA12 were measured. Measurement results are shown in Table 5. The resultant PLA12 was composed of 100% by mole of the L-lactic acid unit, and content of L-lactide in the resultant PLA12 was 0.8% by mass.

Production Example 4

Similar operation as in Production Example 3 was carried out except that D-lactide (having an optical purity of 99.8% ee, manufactured by Musashino Chemical Laboratory, Ltd.) was used instead of L-lactide, to yield PLA13. Mw and mass ratio of the L-lactic acid unit and the D-lactic acid unit of the resultant PLA13 were measured. Measurement results are shown in Table 5. The resultant PLA13 was composed of 99.9% by mole of the D-lactic acid unit, and content of D-lactide in the resultant PLA13 was 0.7% by mass.

Production Example 5

Similar operation as in Production Example 1 was carried out except that amount of lauryl alcohol was changed to 0.7 part by mass, to yield PLA14. Mw and mass ratio of the L-lactic acid unit and the D-lactic acid unit of the resultant PLA14 were measured. Measurement results are shown in Table 5. The resultant PLA14 was composed of 100% by mole of the L-lactic acid unit, and content of L-lactide in the resultant PLA14 was 1.1% by mass.

Production Example 6

Similar operation as in Production Example 5 was carried out except that D-lactide (having an optical purity of 99.8% ee, manufactured by Musashino Chemical Laboratory, Ltd.) was used instead of L-lactide, to yield PLA15. Mw and mass ratio of the L-lactic acid unit and the D-lactic acid unit of the resultant PLA15 were measured. Measurement results are shown in Table 5. The resultant PLA15 was composed of 99.9% by mole of the D-lactic acid unit, and content of D-lactide in the resultant PLA15 was 0.5% by mass.

Production Example 7

Similar operation as in Production Example 1 was carried out except that amount of lauryl alcohol was changed to 0.4 part by mass to yield PLA16. Mw and mass ratio of the L-lactic acid unit and the D-lactic acid unit of the resultant PLA16 were measured. Measurement results are shown in Table 5. The resultant PLA16 was composed of 99.9% by mole of the D-lactic acid unit, and content of D-lactide in the resultant PLA16 was 0.6% by mass.

Production Example 8

Into a reactor equipped with a stirring apparatus, 100 parts by mass of D-lactide (an optical purity of 90.5% ee, manufactured by Musashino Chemical Laboratory, Ltd.), and 1 part by mass of lauryl alcohol, as a polymerization initiator, were charged, and purging with nitrogen was carried out three times, followed by melting at 190° C. and adding 0.010 part by mass of tin 2-ethylhexanoate, as a polymerization catalyst, to carry out ring-opening polymerization of D-lactide under stirring for 3 hours.

After completion of the ring-opening polymerization reaction, a reaction product was taken out from the reactor as a melt state and cooled to prepare a plate-like reaction product. Then, the plate-like reaction product was crushed, and charged into the reactor equipped with the stirring apparatus, and subjected to reduced pressure processing at 120° C. under 1.33 kPa, and excess D-lactide was removed to yield to yield PLA17. Mw and mass ratio of the L-lactic acid unit and the D-lactic acid unit of the resultant PLA17 were measured. Measurement results are shown in Table 5. The resultant PLA17 was composed of 90.3% by mole of the D-lactic acid unit, and content of D-lactide in the resultant PLA17 was 0.5% by mass.

Production Example 9

Into a reactor equipped with a stirring apparatus, 100 parts by mass of D-lactide (an optical purity of 99.8% ee, manufactured by Musashino Chemical Laboratory, Ltd.), and 1 part by mass of lauryl alcohol, as a polymerization initiator, were charged, and purging with nitrogen was carried out three times, followed by melting at 190° C. and adding 0.010 part by mass of tin 2-ethylhexanoate, as a polymerization catalyst, to carry out ring-opening polymerization of D-lactide under stirring for 3 hours.

After completion of the ring-opening polymerization reaction, a reaction product was taken out from the reactor as a melt state and cooled to prepare a plate-like reaction product. Measurement results of the resultant PLA18 are shown in Table 5. In addition, the resultant PLA18 was composed of 99.7% by mole of the D-lactic acid unit, and content of D-lactide in the resultant PLA18 was 4.8% by mass.

TABLE 5

| | Sample name | Mw | Charge mass ratio (L component/D component) |
|---|---|---|---|
| Prod. Expl. 1 | PLA10 | 8600 | 100/0 |
| Prod. Expl. 2 | PLA11 | 9400 | 0/100 |
| Prod. Expl. 3 | PLA12 | 39900 | 100/0 |
| Prod. Expl. 4 | PLA13 | 35300 | 0/100 |
| Prod. Expl. 5 | PLA14 | 56400 | 100/0 |
| Prod. Expl. 6 | PLA15 | 53900 | 0/100 |
| Prod. Expl. 7 | PLA16 | 77200 | 0/100 |
| Prod. Expl. 8 | PLA17 | 42100 | 0/100 |
| Prod. Expl. 9 | PLA18 | 39300 | 0/100 |

(Note)
Prod. Expl. = Production Example

Production of a Polylactic Acid Block Copolymer

Comparative Example 1

Into a reactor equipped with a stirrer, 100 parts by mass of PLA10 (poly-L-lactic acid; L component), obtained in Production Example 1, and 1570 parts by mass of D-lactide (D component), the same one used in Production Example 2, were charged (namely, charge mass ratio of the L component and the D component is 6:94), and purging with nitrogen was carried out three times, followed by adding 0.16 part by mass of tin 2-ethylhexanoate, as a polymerization catalyst, to carry out ring-opening polymerization of D-lactide at 190° C. for 3 hours to yield a polylactic acid block copolymer (sample name: PLA20). PLA20 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA20, Mw of PLA20, mass ratio of the L component and the D component in PLA20, ΔHms, crystal melting point (Tm) and rate of content of the stereo-complex crystal are shown in Table 6 and Table 7. In addition, a DSC chart of PLA20 is shown in FIG. 1.

Comparative Example 2

Figure 2:
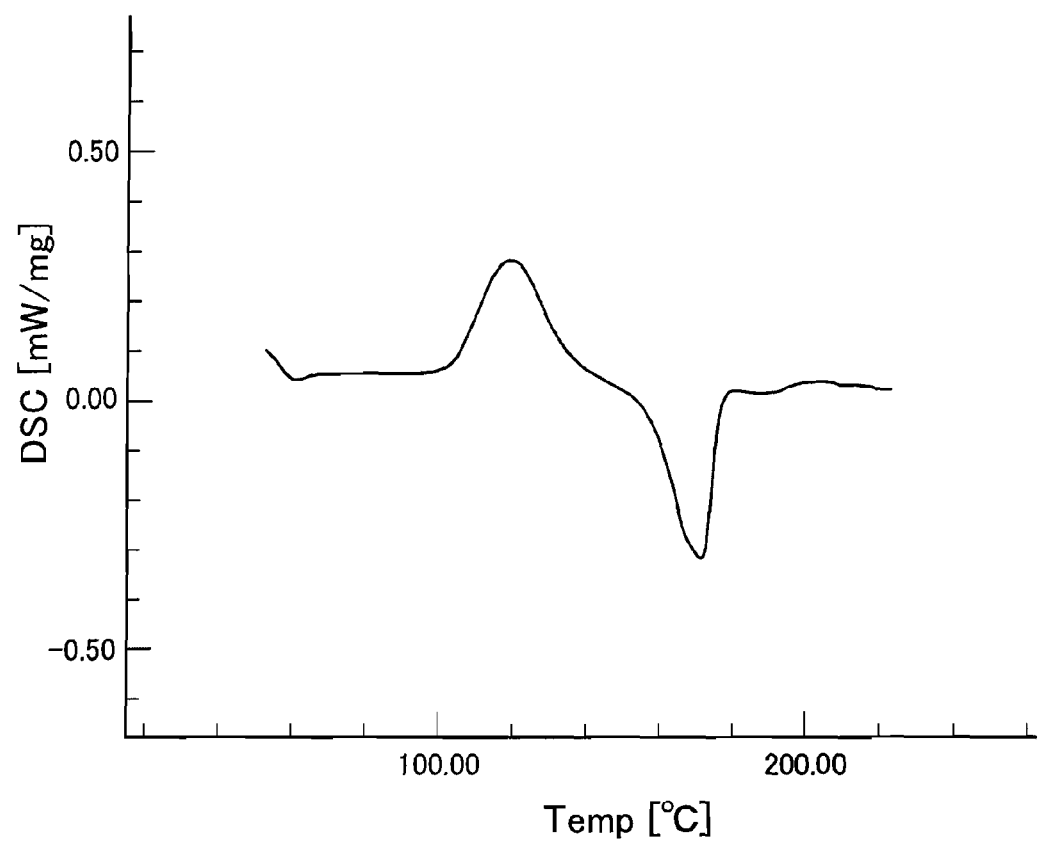
FIG. 2 is a drawing showing a DSC chart of a polylactic acid block copolymer (sample name: PLA21) obtained in Comparative Example 2 to be described later.

Into a reactor equipped with a stirrer, 100 parts by mass of PLA11 (poly-D-lactic acid; D component), obtained in Production Example 2, and 1570 parts by mass of L-lactide (L component), the same one used in Production Example 1, were charged (namely, charge mass ratio of the L component and the D component is 94:6), and purging with nitrogen was carried out three times, followed by adding 0.16 part by mass of tin 2-ethylhexanoate, as a polymerization catalyst, to carry out ring-opening polymerization of L-lactide at 190° C. for 3 hours to yield a polylactic acid block copolymer (sample name: PLA21). PLA21 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA21, Mw of PLA21, mass ratio of the L component and the D component in PLA21, ΔHms, crystal melting point (Tm) and rate of content of the stereo-complex crystal are shown in Table 6 and Table 7. In addition, a DSC chart of PLA21 is shown in FIG. 2.

Example 1

Figure 3:
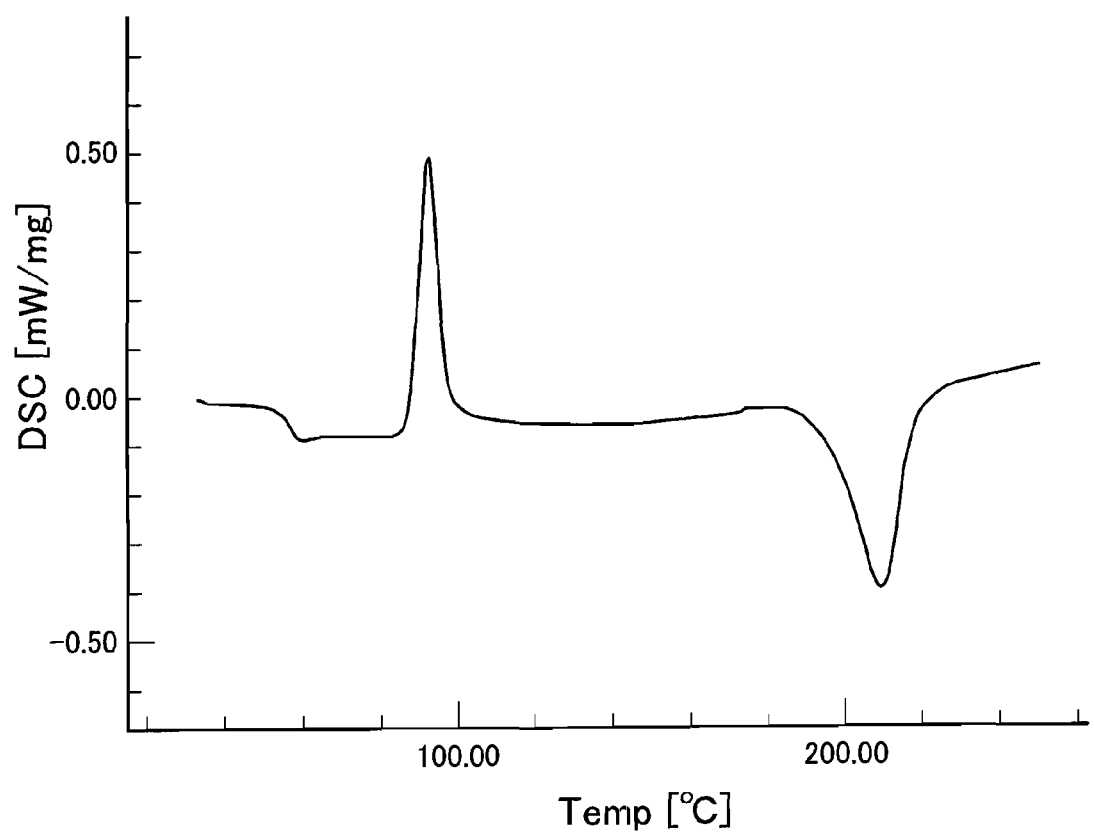
FIG. 3 is a drawing showing a DSC chart of a polylactic acid block copolymer (sample name: PLA22) obtained in Example 1 to be described later.

Into a reactor equipped with a stirrer, 100 parts by mass of PLA12 (poly-L-lactic acid; L component), obtained in Production Example 3, and 400 parts by mass of D-lactide (D component), the same one used in Production Example 2, were charged (namely, charge mass ratio of the L component and the D component is 20:80), and purging with nitrogen was carried out three times, followed by adding 0.04 part by mass of tin 2-ethylhexanoate, as a polymerization catalyst, to carry out ring-opening polymerization of D-lactide at 190° C. for 3 hours to yield a polylactic acid block copolymer (sample name: PLA22). PLA22 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA22, Mw of PLA22, mass ratio of the L component and the D component in PLA22, ΔHms, crystal melting point (Tm) and rate of content of the stereo-complex crystal are shown in Table 6 and Table 7. In addition, a DSC chart of PLA22 is shown in FIG. 3.

Example 2

Figure 4:
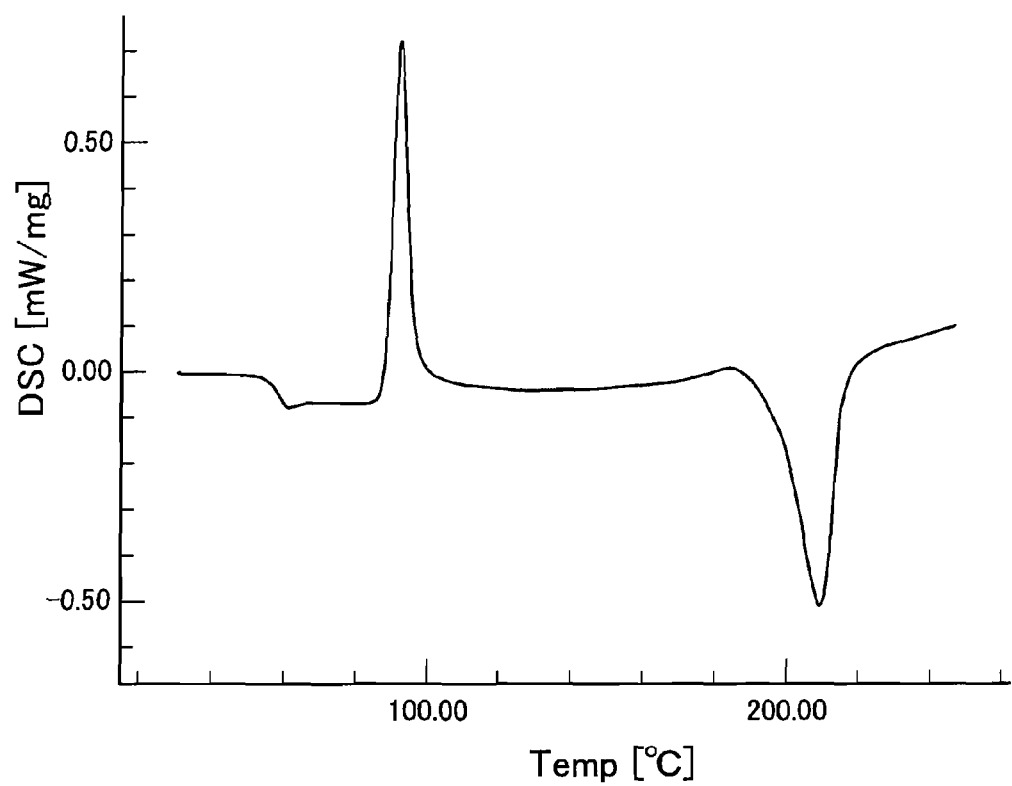
FIG. 4 is a drawing showing a DSC chart of a polylactic acid block copolymer (sample name: PLA23) obtained in Example 2 to be described later.

Into a reactor equipped with a stirrer, 100 parts by mass of PLA13 (poly-D-lactic acid; D component), obtained in Production Example 4, and 400 parts by mass of L-lactide (L component), the same one used in Production Example 1, were charged (namely, charge mass ratio of the L component and the D component is 80:20), and purging with nitrogen was carried out three times, followed by adding 0.04 part by mass of tin 2-ethylhexanoate, as a polymerization catalyst, to carry out ring-opening polymerization of D-lactide at 190° C. for 3 hours to yield a polylactic acid block copolymer (sample name: PLA23). PLA23 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA23, Mw of PLA23, mass ratio of the L component and the D component in PLA23, ΔHms, crystal melting point (Tm) and rate of content of the stereo-complex crystal are shown in Table 6 and Table 7. In addition, a DSC chart of PLA23 is shown in FIG. 4.

Example 3

Figure 5:
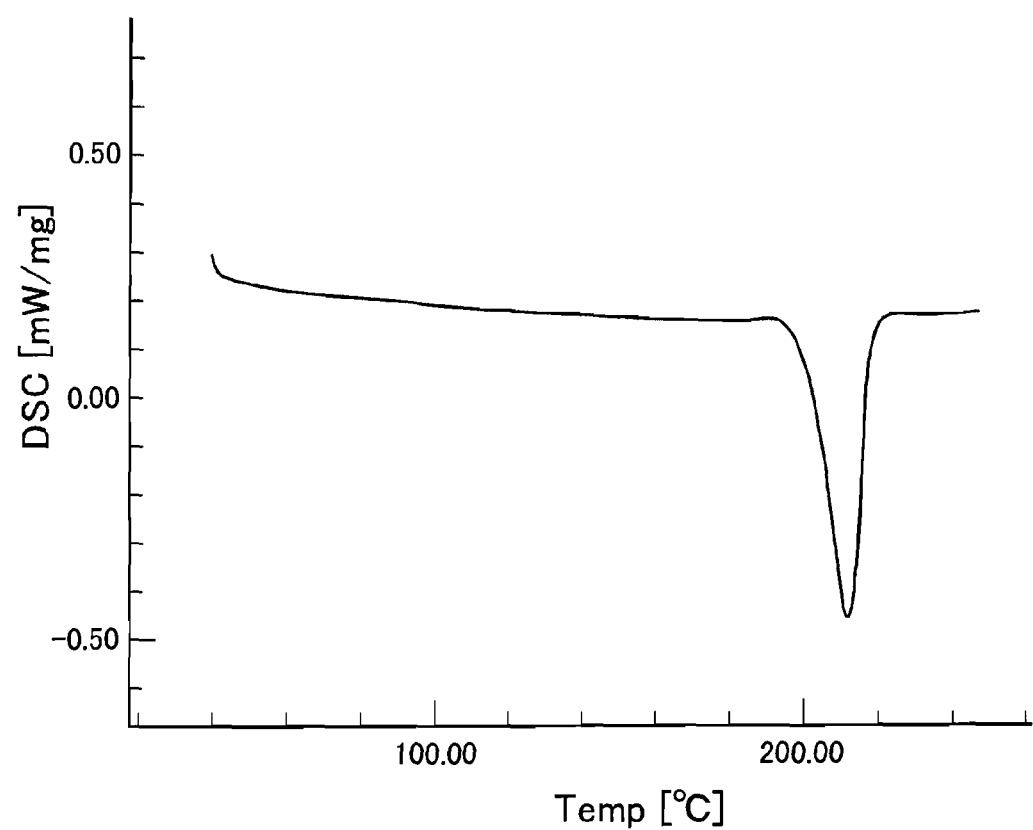
FIG. 5 is a drawing showing a DSC chart of a polylactic acid block copolymer (sample name: PLA24) obtained in Example 3 to be described later.

Into a reactor equipped with a stirrer, 100 parts by mass of PLA14 (poly-L-lactic acid; L component), obtained in Production Example 5, and 186 parts by mass of D-lactide (D component), the same one used in Production Example 2, were charged (namely, charge mass ratio of the L component and the D component is 35:65), and purging with nitrogen was carried out three times, followed by adding 0.02 part by mass of tin 2-ethylhexanoate, as a polymerization catalyst, to carry out ring-opening polymerization of L-lactide at 190° C. for 3 hours to yield a polylactic acid block copolymer (sample name: PLA24). PLA24 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA24, Mw of PLA24, mass ratio of the L component and the D component in PLA24, ΔHms, crystal melting point (Tm) and rate of content of the stereo-complex crystal are shown in Table 6 and Table 7. In addition, a DSC chart of PLA24 is shown in FIG. 5.

Example 4

Figure 6:
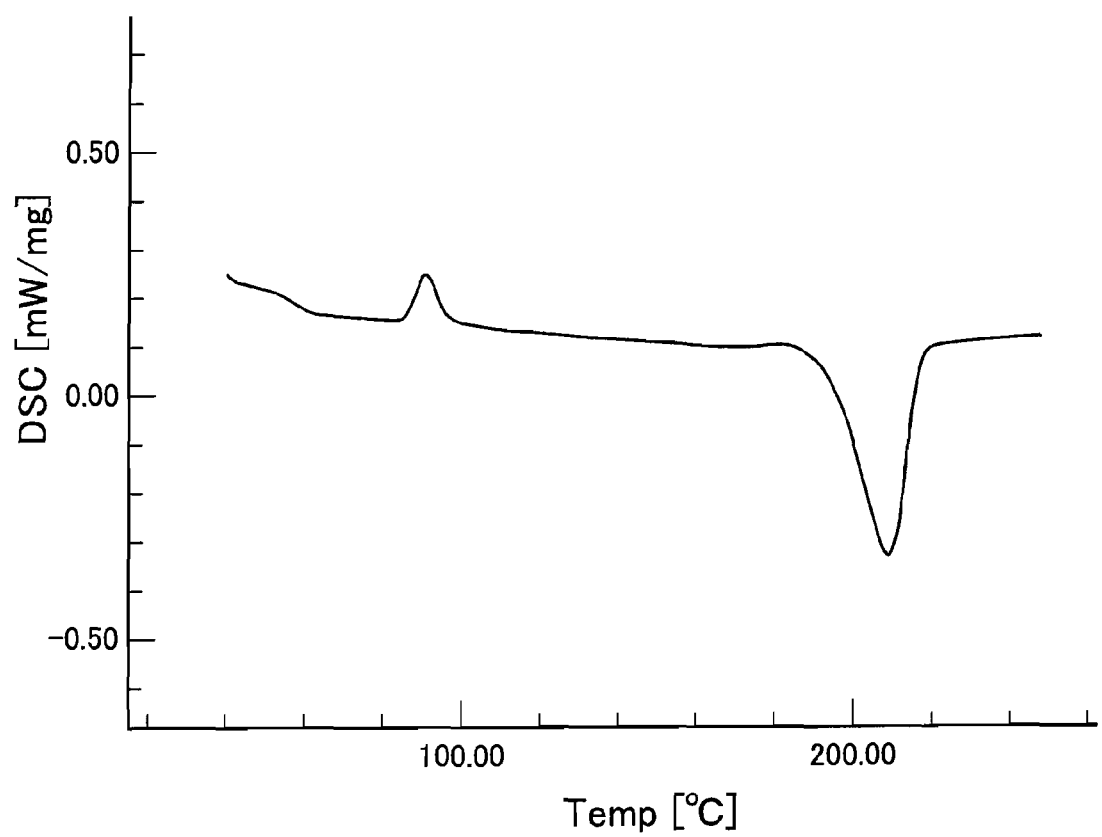
FIG. 6 is a drawing showing a DSC chart of a polylactic acid block copolymer (sample name: PLA25) obtained in Example 4 to be described later.

Into a reactor equipped with a stirrer, 100 parts by mass of PLA15 (poly-D-lactic acid; D component), obtained in Production Example 6, and 186 parts by mass of L-lactide (L component), the same one used in Production Example 1, were charged (namely, charge mass ratio of the L component and the D component is 65:35), and purging with nitrogen was carried out three times, followed by adding 0.02 part by mass of tin 2-ethylhexanoate, as a polymerization catalyst, to carry out ring-opening polymerization of L-lactide at 190° C. for 3 hours to yield a polylactic acid block copolymer (sample name: PLA25). PLA25 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA25, Mw of PLA25, mass ratio of the L component and the D component in PLA25, ΔHms, crystal melting point (Tm) and rate of content of the stereo-complex crystal are shown in Table 6 and Table 7. In addition, a DSC chart of PLA25 is shown in FIG. 6.

Comparative Example 3

Figure 7:
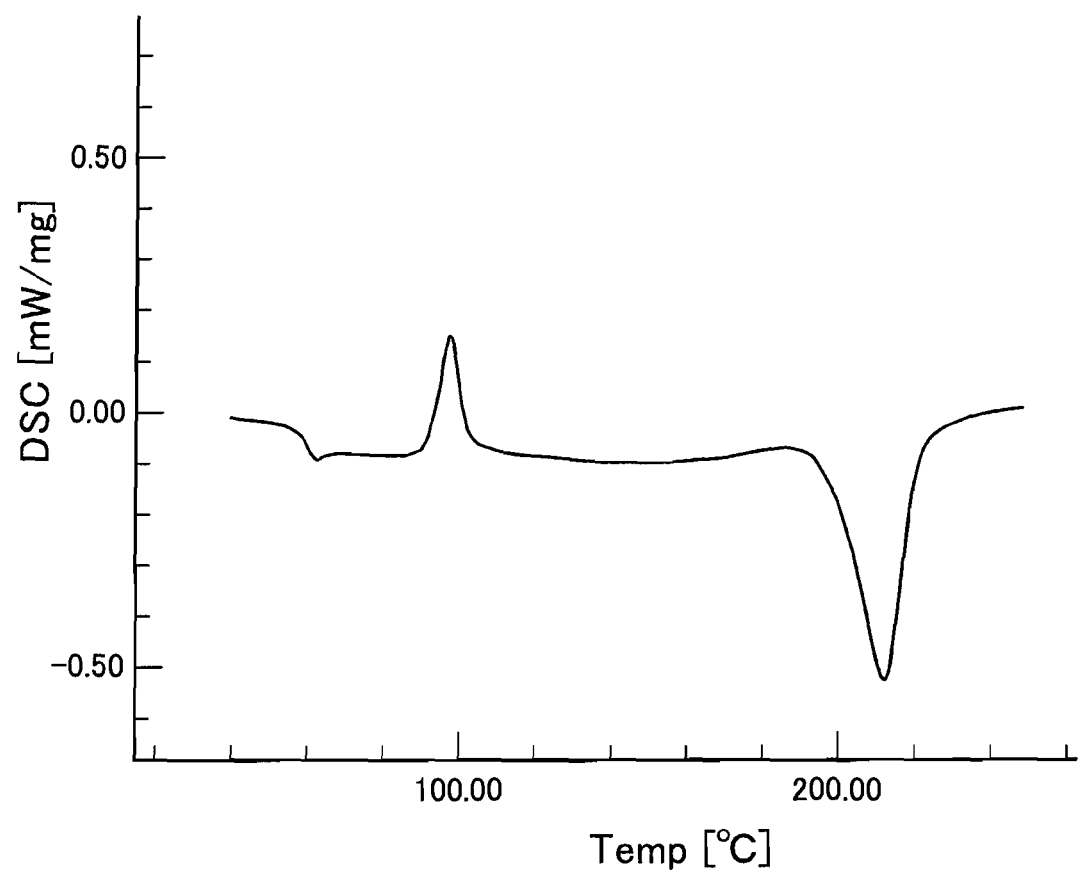
FIG. 7 is a drawing showing a DSC chart of a polylactic acid block copolymer (sample name: PLA26) obtained in Comparative Example 3 to be described later.

Into a reactor equipped with a stirrer, 100 parts by mass of PLA16 (poly-D-lactic acid; D component), obtained in Production Example 7, and 100 parts by mass of L-lactide (L component), the same one used in Production Example 1, were charged (namely, charge mass ratio of the L component and the D component is 50:50), and purging with nitrogen was carried out three times, followed by adding 0.01 part by mass of tin 2-ethylhexanoate, as a polymerization catalyst, to carry out ring-opening polymerization of D-lactide at 190° C. for 3 hours to yield a polylactic acid block copolymer (sample name: PLA26). PLA26 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA26, Mw of PLA26, mass ratio of the L component and the D component in PLA26, ΔHms, crystal melting point (Tm) and rate of content of the stereo-complex crystal are shown in Table 6 and Table 7. In addition, a DSC chart of PLA26 is shown in FIG. 7.

Example 5

Figure 8:
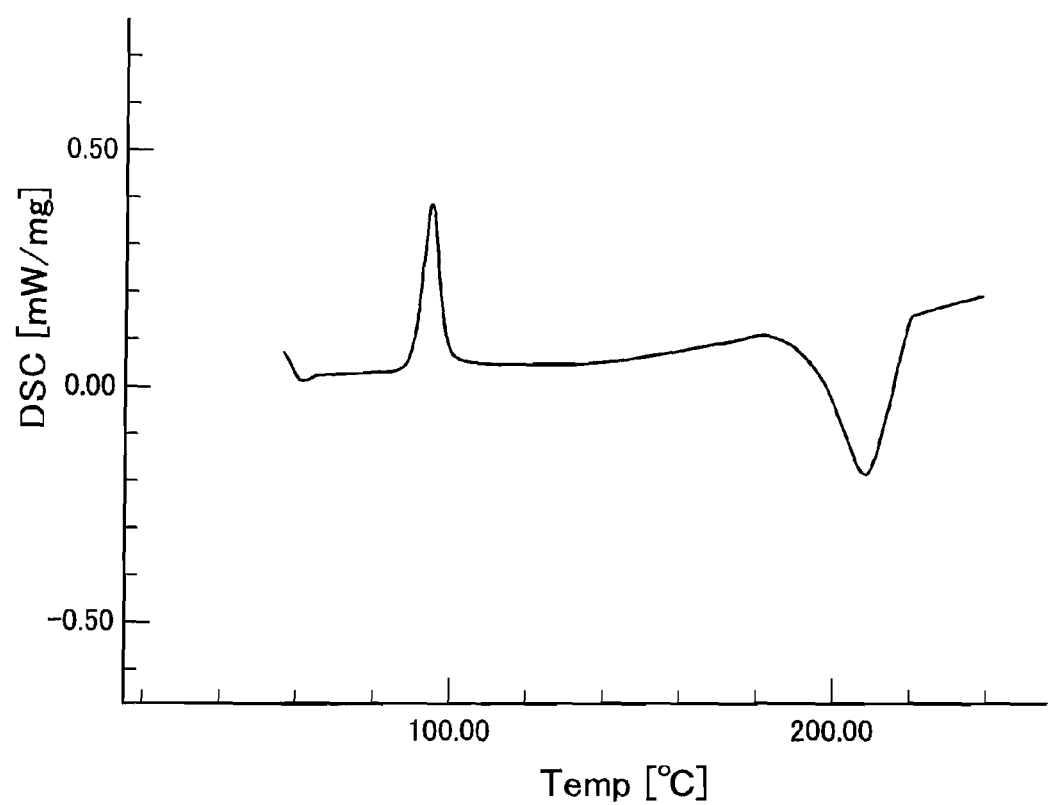
FIG. 8 is a drawing showing a DSC chart of a polylactic acid block copolymer (sample name: PLA27) obtained in Example 5 to be described later.

Into a reactor equipped with a stirrer, 100 parts by mass of PLA16 (poly-D-lactic acid; D component), obtained in Production Example 7, and 400 parts by mass of L-lactide (having an optical purity of 99.8% ee, manufactured by Musashino Chemical Laboratory, Ltd.), were charged (namely, charge mass ratio of the L component and the D component is 80:20), and purging with nitrogen was carried out three times, followed by adding 0.04 part by mass of tin 2-ethylhexanoate, as a polymerization catalyst, to carry out ring-opening polymerization of D-lactide at 190° C. for 3 hours to yield a polylactic acid block copolymer (sample name: PLA27). PLA27 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA27, Mw of PLA27, mass ratio of the L component and the D component in PLA27, $\Delta$Hms, crystal melting point (Tm) and rate of content of the stereo-complex crystal are shown in Table 6 and Table 7. In addition, a DSC chart of PLA27 is shown in FIG. 8.

Example 6

Figure 9:
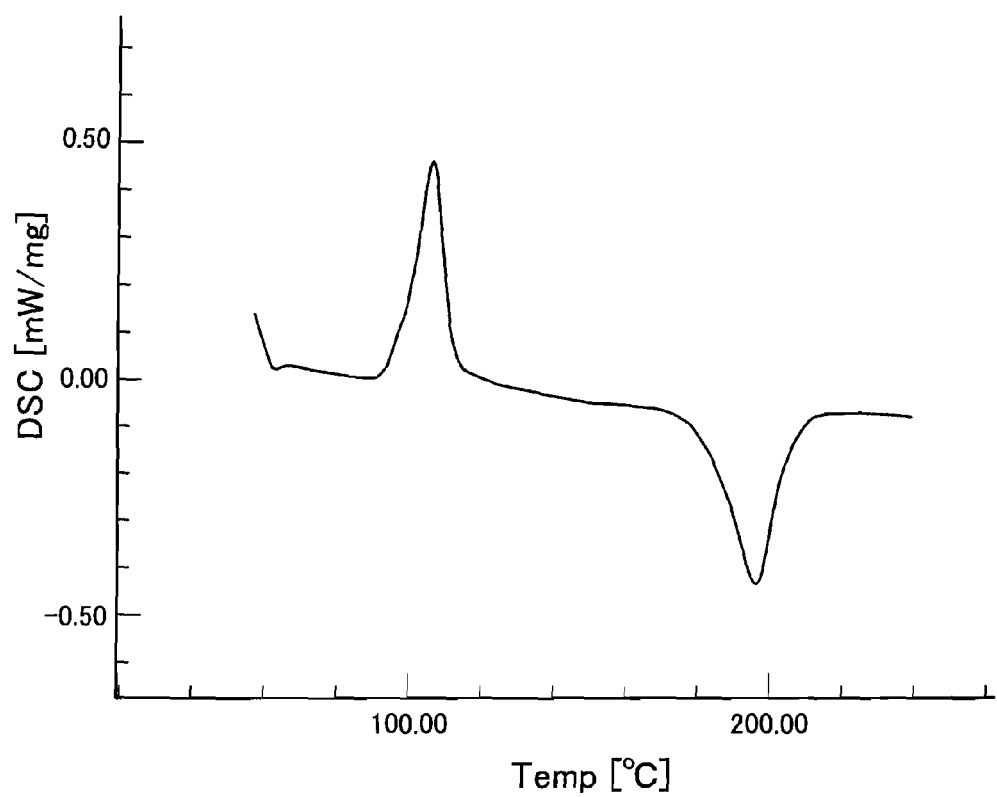
FIG. 9 is a drawing showing a DSC chart of a polylactic acid block copolymer (sample name: PLA28) obtained in Example 6 to be described later.

Into a reactor equipped with a stirrer, 100 parts by mass of PLA17 (poly-D-lactic acid; D component), obtained in Production Example 8, and 400 parts by mass of L-lactide (L component), the same one used in Production Example 1, were charged (namely, charge mass ratio of the L component and the D component is 80:20), and purging with nitrogen was carried out three times, followed by adding 0.04 part by mass of tin 2-ethylhexanoate, as a polymerization catalyst, to carry out ring-opening polymerization of D-lactide at 190° C. for 3 hours to yield a polylactic acid block copolymer (sample name: PLA28). PLA28 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA28, Mw of PLA28, mass ratio of the L component and the D component in PLA28, $\Delta$Hms, crystal melting point (Tm) and rate of content of the stereo-complex crystal are shown in Table 6 and Table 7. In addition, a DSC chart of PLA28 is shown in FIG. 9.

Example 7

Figure 10:
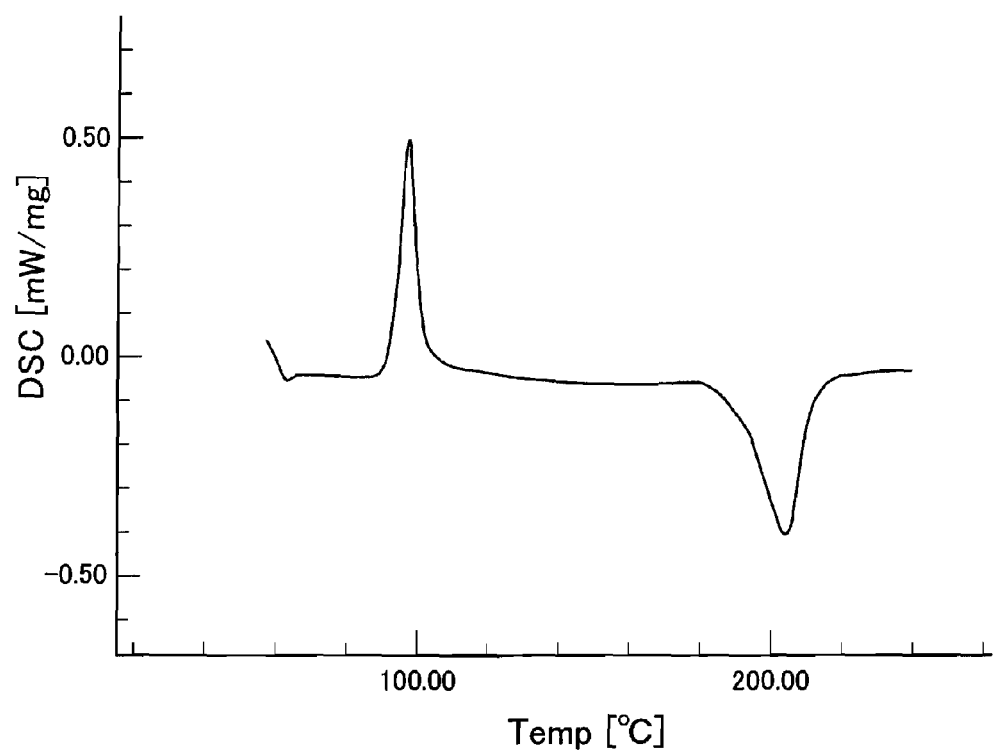
FIG. 10 is a drawing showing a DSC chart of a polylactic acid block copolymer (sample name: PLA29) obtained in Example 7 to be described later.

Into a reactor equipped with a stirrer, 100 parts by mass of PLA18 (poly-D-lactic acid; D component), obtained in Production Example 9, and 400 parts by mass of L-lactide (L component), the same one used in Production Example 1, were charged (namely, charge mass ratio of the L component and the D component is 80:20), and purging with nitrogen was carried out three times, followed by adding 0.04 part by mass of tin 2-ethylhexanoate, as a polymerization catalyst, to carry out ring-opening polymerization of L-lactide at 190° C. for 3 hours to yield PLA29. PLA29 was obtained by dissolving the polymer into 1000 parts by mass of chloroform, relative to 100 parts by mass of the polymer, and then precipitating into 6000 parts by mass of methanol, relative to 100 parts by mass of the polymer. The precipitated polymer was subjected to solid-liquid separation, and drying to be used for measurement. Mass ratio of the L component and the D component in charging of PLA29, Mw of PLA29, mass ratio of the L component and the D component in PLA29, $\Delta$Hms, crystal melting point (Tm) and rate of content of the stereo-complex crystal are shown in Table 6 and Table 7. In addition, a DSC chart of PLA29 is shown in FIG. 10.

Example 8

Figure 11:
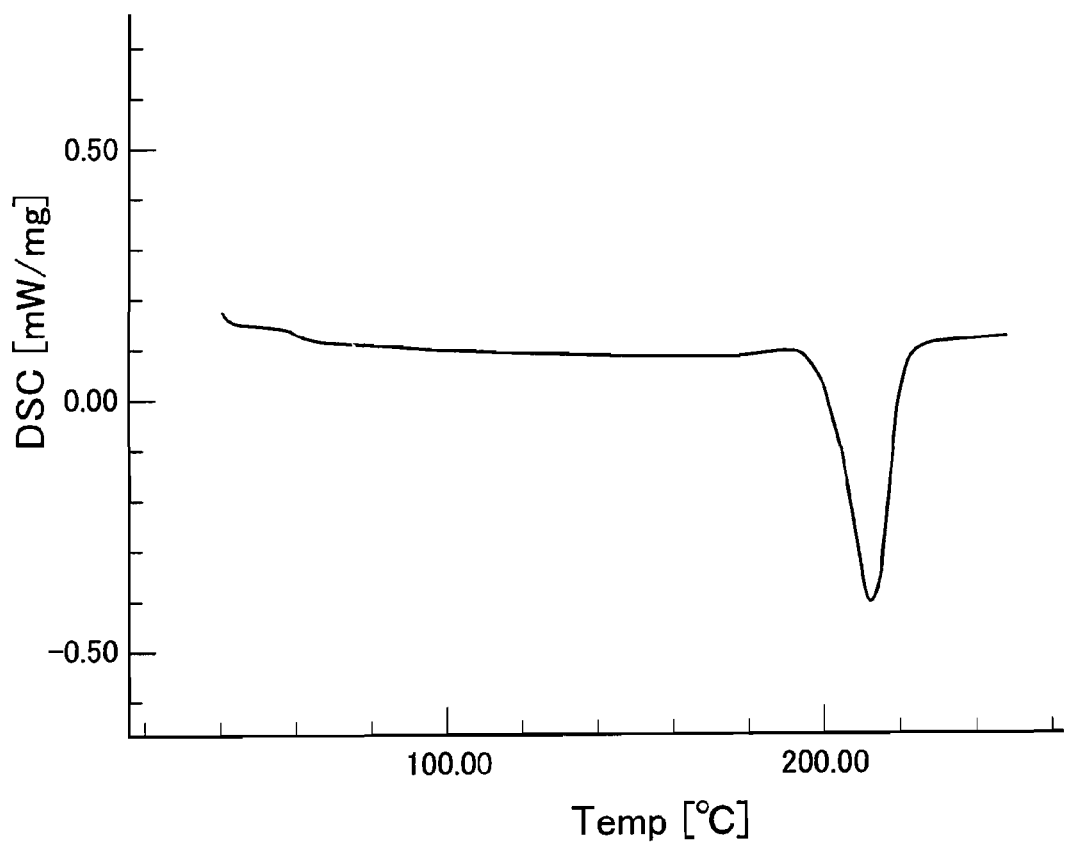
FIG. 11 is a drawing showing a DSC chart of a polylactic acid block copolymer (sample name: PLA30) obtained in Example 8 to be described later.

Into a reactor equipped with a stirrer, 100 parts by mass of PLA22 obtained in Example 1, and 100 parts by mass of PLA23 obtained in Example 2 were charged and purging with nitrogen was carried out three times, followed by heating and stirring at 200° C. for 10 minutes to yield PLA30. Mw of PLA30, mass ratio of the L component and the D component in PLA30, $\Delta$Hms, crystal melting point (Tm) and rate of content of the stereo-complex crystal are shown in Table 6 and Table 7. In addition, a DSC chart of PLA30 is shown in FIG. 11.

TABLE 6

| | Sample name | Charge mass ratio (L component/D component) | Mw | Mass ratio in polymer (L component/D component) |
|---|---|---|---|---|
| Com. Expl. 1 | PLA20 | 6/94 | 154,000 | 5.9/94.1 |
| Com. Expl. 2 | PLA21 | 94/6 | 160,000 | 93.5/6.5 |
| Example 1 | PLA22 | 80/20 | 141,000 | 78.3/21.7 |
| Example 2 | PLA23 | 20/80 | 143,000 | 19.1/80.9 |
| Example 3 | PLA24 | 35/65 | 166,000 | 33.9/66.1 |
| Example 4 | PLA25 | 65/35 | 159,000 | 64.9/35.1 |
| Com. Expl. 3 | PLA26 | 50/50 | 144,000 | 53.3/46.7 |
| Example 5 | PLA27 | 80/20 | 256,000 | 79.5/20.5 |
| Example 6 | PLA28 | 80/20 | 159,000 | 80.1/19.9 |
| Example 7 | PLA29 | 80/20 | 149,000 | 77.9/22.1 |
| Example 8 | PLA30 | 50/50 | 142,000 | 48.7/51.3 |

(Note)
Com. Expl. = Comparative Example

TABLE 7

| Sample name | DSC | $\Delta$Hms (J/g) | Rate of content of stereo-complex crystal (%) | Crystal melting point (° C.) |
|---|---|---|---|---|
| PLA20 | 1st. time | 3.5 | 13 | 193.1 |
| | 2nd. time | 3.1 | 10 | 191.0 |
| | 3rd. time | 2.8 | 9 | 187.5 |
| PLA21 | 1st. time | 1.7 | 6 | 189.6 |
| | 2nd. time | 1.7 | 6 | 188.8 |
| | 3rd. time | 1.5 | 4 | 188.3 |
| PLA22 | 1st. time | 44.2 | 100 | 210.0 |
| | 2nd. time | 40.5 | 100 | 209.1 |
| | 3rd. time | 38.9 | 100 | 208.5 |
| PLA23 | 1st. time | 36.2 | 100 | 208.5 |
| | 2nd. time | 33.4 | 100 | 207.1 |
| | 3rd. time | 31.2 | 100 | 205.5 |
| PLA24 | 1st. time | 40.4 | 100 | 212.4 |
| | 2nd. time | 38.2 | 100 | 212.0 |
| | 3rd. time | 38.2 | 100 | 211.2 |
| PLA25 | 1st. time | 38.5 | 100 | 208.5 |
| | 2nd. time | 37.9 | 100 | 208.3 |
| | 3rd. time | 38.2 | 100 | 208.1 |

TABLE 7-continued

| Sample name | DSC | ΔHms (J/g) | Rate of content of stereo-complex crystal (%) | Crystal melting point (° C.) |
|---|---|---|---|---|
| PLA26 | 1st. time | 41.1 | 100 | 211.8 |
| | 2nd. time | 38.2 | 100 | 209.6 |
| | 3rd. time | 36.2 | 100 | 207.9 |
| PLA27 | 1st. time | 27.4 | 100 | 208.3 |
| | 2nd. time | 27.3 | 100 | 207.7 |
| | 3rd. time | 27.1 | 100 | 207.7 |
| PLA28 | 1st. time | 38.9 | 100 | 195.3 |
| | 2nd. time | 38.8 | 100 | 193.8 |
| | 3rd. time | 37.2 | 100 | 192.2 |
| PLA29 | 1st. time | 35.0 | 100 | 204.1 |
| | 2nd. time | 33.3 | 100 | 203.7 |
| | 3rd. time | 32.1 | 100 | 202.6 |
| PLA30 | 1st. time | 38.9 | 100 | 212.4 |
| | 2nd. time | 38.6 | 100 | 211.9 |
| | 3rd. time | 36.5 | 100 | 208.8 |

The first time, the second time and the third time of the DSC column in the above Table 7 represent repeated operation number from (a) to (b) described in the above Table 4, and ΔHms, rate of content of a stereo-complex crystal, and crystal melting point represent values obtained by each operation at the first time, the second time and the third time.

As is clear from the above Table 6 and Table 7, it was found that, according to a production method of the present invention, a polylactic acid block copolymer having rate of content of a stereo-complex crystal of 100% can be obtained, even when charge ratio (mass ratio) of the L component (poly-L-lactic acid or L-lactide) and the D component (poly-D-lactic acid or D-lactide) to be used is significantly biased. On the other hand, in a polylactic acid block copolymer of Comparative Example 1 and Comparative Example 2, wherein mass ratio of the L component and the D component in a polymer is outside a range of the present invention, rate of content of a stereo-complex crystal was significantly reduced. In addition, a polylactic acid block copolymer of Comparative Example 3, wherein mass ratio of an L component and a D component in a polymer is about 53:47, has rate of content of a stereo-complex crystal of 100%, and high crystal melting point. However, reduction effect of production cost of a polylactic acid block copolymer is said low, because of high content of the D component in a polymer.

It should be noted that the present application is based on Japanese Patent Application No. 2006-356241 filed on Dec. 28, 2006, whose disclosed content is incorporated by reference in its entirety.

The invention claimed is:

1. A method for producing a polylactic acid block copolymer comprising:
   (i) performing a ring-opening polymerization of a D-component consisting essentially of D-lactide in the presence of an L-component consisting essentially of poly-L-lactic acid,
   or
   (ii) performing a ring-opening polymerization of an L-component consisting essentially of L-lactide in the presence of a D-component consisting essentially of poly-D-lactic acid,
wherein the mass ratio of said D component to said L component for (i) is between 60/40 and 91/9, or the mass ratio of said L component to said D component for (ii) is between 60/40 and 91/9; and wherein said ring-opening polymerization is performed in a molten state from 15 minutes to 5 hours.

2. The production method according to claim 1, characterized in that the mass ratio of said D component to said L component in (i) is between 71/29 and 91/9, or the L component to the D component for (ii) is between 71/29 and 91/9.

3. The production method according to claim 1, characterized in that
   (i) the ring-opening polymerization of a D-component consisting essentially of D-lactide is carried out in the presence of an L-component consisting essentially of poly-L-lactic acid, and the mass ratio of said D component and said L component is between 60/40 and 91/9, or
   (ii) the ring-opening polymerization of an L-component consisting essentially of L-lactide is carried out in the presence of a D-component consisting essentially of poly-D-lactic acid, and the mass ratio of said L component and said D component is between 60/40 and 91/9.

4. The production method according to claim 2, characterized in that
   (i) the ring-opening polymerization of a D-component consisting essentially of D-lactide is carried out in the presence of an L-component consisting essentially of poly-L-lactic acid, and the mass ratio of said D component and said L component is between 71/29 and 91/9, or
   (ii) the ring-opening polymerization of an L-component consisting essentially of L-lactide is carried out in the presence of a D-component consisting essentially of poly-D-lactic acid, and the mass ratio of said L component and said D component is between 71/29 and 91/9.

5. A method for producing a polylactic acid block copolymer comprising the step of melt mixing or solution mixing:
   (i) a first polylactic acid block copolymer, that is a polylactic acid block copolymer obtained by a process comprising the ring-opening polymerization of a D-component consisting essentially of D-lactide in the presence of an L-component consisting essentially of poly-L-lactic acid, wherein the mass ratio of said D component and said L component is between 60/40 and 91/9, and
   (ii) a second polylactic acid block copolymer, that is a polylactic acid block copolymer obtained by a process comprising the ring-opening polymerization of an L-component consisting essentially of L-lactide in the presence of a D-component consisting essentially of poly-D-lactic acid, wherein the mass ratio of said L component and said D component is between 60/40 and 91/9;
wherein said ring-opening polymerization is performed in a molten state from 15 minutes to 5 hours.

6. The production method according to claim 5, characterized in that mass ratio of said D component and said L component in said first polylactic acid block copolymer is between 71/29 and 91/9, and the mass ratio of said L component and said D component in said second polylactic acid block copolymer is between 71/29 and 91/9.

7. A method for producing a polylactic acid block copolymer comprising the step of melt mixing or solution mixing:
   (i) a first polylactic acid block copolymer, that is a polylactic acid block copolymer obtained by a process comprising the ring-opening polymerization of a D-component consisting essentially of D-lactide in the presence of an L-component consisting essentially of poly-L-lactic acid, wherein the mass ratio of said L component and said D component is between 60/40 and 91/9, and
   (ii) a second polylactic acid block copolymer, that is a polylactic acid block copolymer obtained by a process comprising the ring-opening polymerization of an L-component consisting essentially of L-lactide in the presence of a D-component consisting essentially of poly-D-lactic acid, wherein the mass ratio of said D component and said L component is between 60/40 and 91/9;

wherein said ring-opening polymerization is performed in a molten state from 15 minutes to 5 hours.

8. The production method according to claim 7, characterized in that the mass ratio of said L component and said D component in said first polylactic acid block copolymer is between 71/29 and 91/9, and the mass ratio of said D component and said L component in said second polylactic acid block copolymer is between 71/29 and 91/9.

9. The production method according to claim 1, characterized in that the mass ratio of an L-lactic acid unit and a D-lactic acid unit in said poly-L-lactic acid is between 95/5 and 100/0, and the mass ratio of a D-lactic acid unit and an L-lactic acid unit in said poly-D-lactic acid is between 95/5 and 100/0.

10. The production method according to claim 1, characterized in that optical purity of said D-lactide or said L lactide is in a range of from 90 to 100% ee.

11. The production method according to claim 1, characterized in that said poly-L-lactic acid is obtained by the ring-opening polymerization of L-lactide, and said poly-D-lactic acid is obtained by the ring-opening polymerization of D-lactide.

12. The production method according to claim 1, characterized in that said poly-L-lactic acid is obtained by the ring-opening polymerization of L-lactide, and by the subsequent removal of excess lactide, and said poly-D-lactic acid is obtained by the ring-opening polymerization of D-lactide, and by subsequent removal of excess lactide.

13. The production method according to claim 12, characterized in that said removal of excess lactide is carried out by reducing the pressure.

14. The production method according to claim 1, characterized in that the residual amount of L-lactide in a reaction system, before carrying out the ring-opening polymerization of D-lactide in the presence of said poly-L-lactic acid, is from 0 to 5% by mass, relative to the mass of said poly-L-lactic acid, and the residual amount of D-lactide in the reaction system, before carrying out the ring-opening polymerization of L-lactide in the presence of said poly-D-lactic acid, is from 0 to 5% by mass, relative to the mass of said poly-D-lactic acid.

15. A polylactic acid block copolymer prepared by the method of claim 1, characterized in that the mass ratio of the L-lactic acid unit and the D-lactic acid unit is between 60/40 and 91/9, or the mass ratio of the D-lactic acid unit and the L-lactic acid unit is between 60/40 and 91/9, and the content of stereo-complex crystal is from 80% to 100%, even with repeated melting and crystallization.

16. The polylactic acid block copolymer according to claim 15, characterized in that the mass ratio of the L-lactic acid unit and the D-lactic acid unit is between 71/29 and 91/9, or the mass ratio of the D-lactic acid unit and the L-lactic acid unit is between 71/29 and 91/9.

17. The polylactic acid block copolymer according to claim 15, characterized in that the weight average molecular weight (Mw) is from 80,000 to 500,000.

18. The polylactic acid block copolymer according to claim 15, characterized in that the crystal melting point is in a range of from 190 to 250° C. measured by differential scanning calorimetry, which is observed in the temperature raising step, by three times repetition of a program comprising a temperature raising step from 30 to 250° C. and a quenching step from 250 to 30° C.

19. A molded article containing the polylactic acid block copolymer according to claim 15.

20. The method of claim 5, wherein components (i) and (ii) are melt mixed.

* * * * *